US008610822B2

(12) United States Patent
Weber et al.

(10) Patent No.: US 8,610,822 B2
(45) Date of Patent: Dec. 17, 2013

(54) CAMERA ALIGNMENT AND MOUNTING STRUCTURES

(75) Inventors: Trent Weber, Saratoga, CA (US); Scott Myers, San Francisco, CA (US); David A. Pakula, San Francisco, CA (US); Matthew Hill, Mountain View, CA (US); Erik L. Wang, Redwood City, CA (US); Richard Hung Minh Dinh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 228 days.

(21) Appl. No.: 12/794,664

(22) Filed: Jun. 4, 2010

(65) Prior Publication Data

US 2011/0255000 A1 Oct. 20, 2011

Related U.S. Application Data

(60) Provisional application No. 61/325,768, filed on Apr. 19, 2010.

(51) Int. Cl.
*H04N 5/225* (2006.01)

(52) U.S. Cl.
USPC .......................................................... 348/374

(58) Field of Classification Search
USPC .................................................. 348/373, 374
See application file for complete search history.

(56) References Cited

U.S. PATENT DOCUMENTS

| | | | |
|---|---|---|---|
| 3,984,854 A * | 10/1976 | Wolcott | 396/535 |
| 5,763,824 A | 6/1998 | King | |
| 5,952,715 A | 9/1999 | Sekiguchi | |
| 6,133,657 A | 10/2000 | Semenik | |
| 6,269,145 B1 * | 7/2001 | Piestrup et al. | 378/81 |
| 6,584,285 B2 * | 6/2003 | Nagata | 396/177 |
| 7,031,083 B2 * | 4/2006 | Chen | 359/819 |
| 7,177,161 B2 | 2/2007 | Shima | |
| 7,388,616 B2 * | 6/2008 | Yamazaki | 348/373 |
| 7,609,530 B2 | 10/2009 | Snider | |
| 7,639,187 B2 | 12/2009 | Caballero | |
| 7,658,095 B2 | 2/2010 | Sanford | |
| 2003/0117787 A1 | 6/2003 | Nakauchi | |
| 2006/0276059 A1 * | 12/2006 | Dittmann et al. | 439/67 |

(Continued)

OTHER PUBLICATIONS

Jason Chen, "This Is Apple's Next iPhone", Apr. 19, 2010, GIZMODO.COM, pp. 1-8.*

(Continued)

*Primary Examiner* — Roberto Velez
*Assistant Examiner* — Gary C Vieaux
(74) *Attorney, Agent, or Firm* — Treyz Law Group; David C. Kellogg

(57) ABSTRACT

An electronic device may be provided with a housing. A camera module may be mounted within the housing. The housing may have a camera window with which a lens in the camera module is aligned. To rotationally and laterally align the camera module with respect to the camera window and the electronic device housing, an alignment structure may be mounted to the housing in alignment with the camera window and housing. The alignment structure may be formed form a ring-shaped structure with an opening. The alignment structures may have sidewalls that form an alignment groove for the camera module. The camera window may be formed from a circular opening in a layer of opaque material deposited on a transparent housing member such as a planar layer of glass. During the process, a laser tool may be used to trim the opening in the opaque material.

9 Claims, 29 Drawing Sheets

(56) References Cited

U.S. PATENT DOCUMENTS

2008/0044174 A1* 2/2008 Kleverman ............... 396/529
2008/0158173 A1* 7/2008 Hamblin et al. ........... 345/173
2009/0159329 A1 6/2009 Krohn
2010/0309369 A1* 12/2010 Jarvis et al. .............. 348/371

OTHER PUBLICATIONS

Joshua Topolsky, "iPhone 4G: is this it?", Apr. 17, 2010, ENGADGET.COM, pp. 1-2.*
Jesus Diaz, "Clear iPhone 3G Replacement Cover Shows Its Fugly Guts", Dec. 28, 2008, GIZMODO.COM, p. 1.*
Jason Chen, "The Next iPhone Dissected", Apr. 20, 2010, GIZMODO.COM, pp. 1-7.*
forumsmacnn.com, "iPhone Camera Fuzziness . . . ", FORUMS.MACNN.COM, May 17-Jul. 30, 2008, pp. 1-5.*
iFixit.com, "Installing iPhone 3G Rear Panel", IFIXIT.COM, Mar. 2009, pp. 1-12.*
chinaveboss.com, "iPhone 1st Generation Teardown Guide", 2012, CHINAVEBOSS.COM, pp. 1-12.*
toxel.com, "10 Beautiful Apple iPhone Concept Designs", TOXEL.COM, Feb. 15, 2009, pp. 1-11.*
Renay, B.; "Customers Across the Country Line Up As Blackberry Storm Blows into Verizon Wireless Communication Stores", Nov. 21, 2008; news.verizonwireless.com; pp. 1-2.*
Forrester, J.; "Repairing Blackberry Storm LCD/Digitizer Replacement"; 2012; www.ifixit.com; pp. 1-5.*
ifixit.com, "Replacing iPhone 1st Generation Camera", http://www.ifixit.com/Guide, May 31, 2009.*
Pennengineering "ReelFast SMT Surface Mount Fasteners Bulletin," 2004.
Schmidt, Mathias et al. U.S. Appl. No. 12/728,171, filed Mar. 19, 2010.
Wang, Erik L. U.S. Appl. No. 12/472,192, filed May 26, 2009.
Sanford, Emery et al. U.S. Appl. No. 12/688,817, filed Jan. 15, 2010.
Mittleman, Adam D. et al. U.S. Appl. No. 12/113,902, filed May 1, 2008.
"How Stuff Works: Battery Pictures" [online] [retrieved on Dec. 9, 2009]: HowStuffWorks, Inc. 1998-2010 <URL:http://electronics.howstuffworks.com/battery-pictures1.htm>.
Park, Young-Bae et al. U.S. Appl. No. 12/785,395, filed May 21, 2010.
Mittleman, Adam D. et al. U.S. Appl. No. 12/113,910, filed May 1, 2008.
Mittleman, Adam D. et al. U.S. Appl. No. 12/113,908, filed May 1, 2008.
Wittenberg, Michael B. U.S. Appl. No. 12/789,387, filed May 27, 2010.
Dinh, Richard Hung Ming et al. U.S. Appl. No. 12/794,601, filed Jun. 4, 2010.
Dinh, Richard Hung Minh et al. U.S. Appl. No. 12/794,599, filed Jun. 4, 2010.
Weber, Trent et al. U.S. Appl. No. 12/794,651, filed Jun. 4, 2010.
Weber, Trent et al. U.S. Appl. No. 12/794,633, filed Jun. 4, 2010.

* cited by examiner

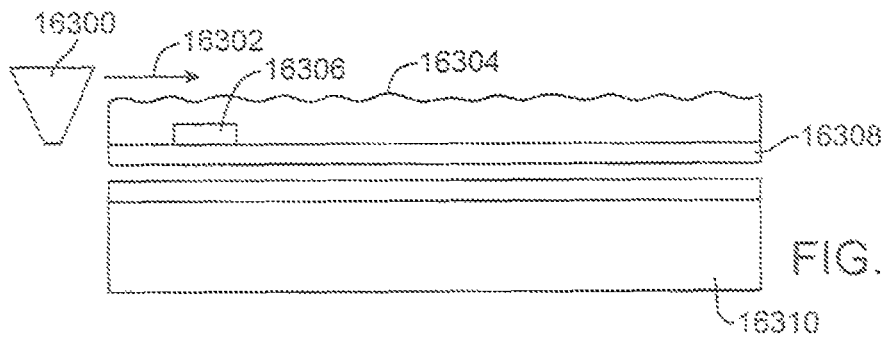
FIG. 26
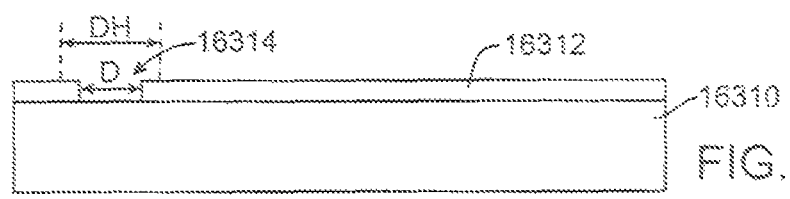
FIG. 27
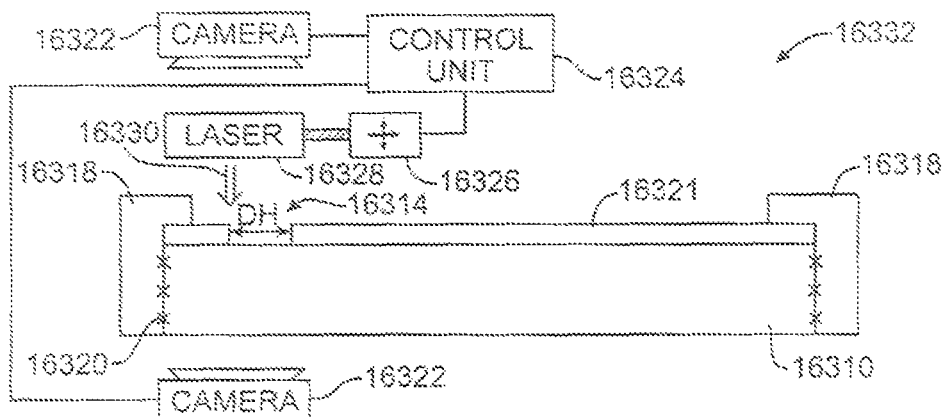
FIG. 28
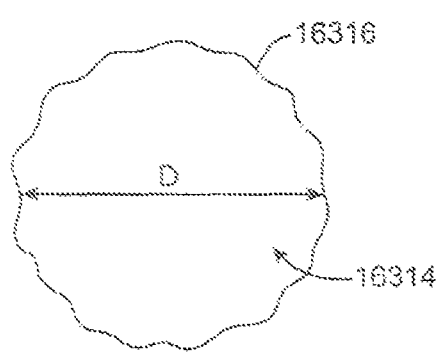 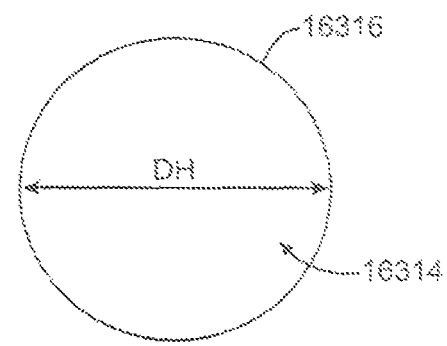
FIG. 29   FIG. 30

CAMERA ALIGNMENT AND MOUNTING STRUCTURES

This application claims the benefit of provisional patent application No. 61/325,768, filed Apr. 19, 2010, which is hereby incorporated by reference herein in its entirety.

BACKGROUND

This relates generally to electronic devices and components for electronic devices.

Electronic devices such as cellular telephones include numerous electronic and mechanical components. Care should be taken that these components are durable, attractive in appearance, and exhibit good performance. Tradeoffs must often be made. For example, it may be difficult to design a robust mechanical part that is attractive in appearance. The designs for attractive and compact parts and parts that perform well under a variety of operating environments also pose challenges.

It would therefore be desirable to be able to provide improved electronic devices and parts for electronic devices.

SUMMARY

Electronic devices may be provided that include mechanical and electronic components. These components may include mechanical structures such as mounting structures and electrical components such as integrated circuits, printed circuit boards, and electrical devices that are mounted to printed circuit boards. Optical components, connectors, antennas, buttons, and other structures may be included in an electronic device.

An electronic device may have a housing. Electronic components and mechanical structures may be formed within the housing. To ensure that the electronic device is attractive, attractive materials such as metal and plastic may be used to form parts of an electronic device. Compact size may be achieved by using compact internal mounting structures. Good electrical performance may be achieved by designing an electronic device to handle a variety of thermal and electrical loads.

Optical structures may be included in an electronic device such as a cellular telephone or other portable device. For example, lenses and camera structures may be provided.

BRIEF DESCRIPTION OF THE DRAWINGS

FIG. 26 is a cross-sectional side view of an illustrative cover glass structure on which a pattern of black ink is being deposited using a silk screening process in accordance with an embodiment of the present invention.

FIG. 27 is a cross-sectional side view of the cover glass structure of FIG. 1 following formation of a layer of black ink with an undersized opening in accordance with an embodiment of the present invention.

FIG. 28 is a cross-sectional side view of the cover glass structure of FIG. 27 following attachment of structural members such as frame members showing how a laser trimming tool may be used to trim the edges of the opening in the black ink layer in accurate alignment with the frame members in accordance with an embodiment of the present invention.

FIG. 29 is a top view of a black ink opening prior to laser trimming operations in accordance with an embodiment of the present invention.

FIG. 30 is a top view of the black ink opening of FIG. 29 after laser trimming operations have been performed using a system of the type shown in FIG. 28 in accordance with an embodiment of the present invention.

DETAILED DESCRIPTION

Electronic devices can be provided with cameras, flash, optical parts, camera mounting structures and the like.

Proper assembly of an electronic device involves aligning the camera module to the device. To rotationally and laterally align a camera module with respect to a camera window and the electronic device housing, an alignment structure may be mounted to the housing in alignment with the camera window and housing. The camera module may be mounted within the alignment structure. The alignment structure may be formed form a ring-shaped structure with an opening. The alignment structure and camera module may have mating engagement features.

Alignment structures may be implemented using a structure such as a plastic plate member with sidewalls. The plate member may be attached to a rear surface member. The sidewalls of the plate may form an alignment groove. The planar surface of the rear surface member may also form an alignment surface. Biasing members such a foam and springs may be used to bias the camera module into position within the alignment structures. If desired, the alignment structures may be formed using hook-shaped members that mate with corresponding protrusions on the camera module.

Electronic device displays are often provided with cover glass layers that have an undercoating of black ink. Openings in the black ink may be formed for components such as cameras. A laser tool may be used to trim the opening in the opaque material.

Electronic devices that may be provided with these components include desktop computers, computer monitors, computer monitors containing embedded computers, wireless computer cards, wireless adapters, televisions, set-top boxes, gaming consoles, routers, portable electronic devices such as laptop computers, tablet computers, and handheld devices such as cellular telephones and media players, and small devices such as wrist-watch devices, pendant devices, headphone and earpiece devices, and other wearable and miniature devices. Portable devices such as cellular telephones, media players, and other handheld electronic devices are sometimes described herein as an example.

Figure 1:
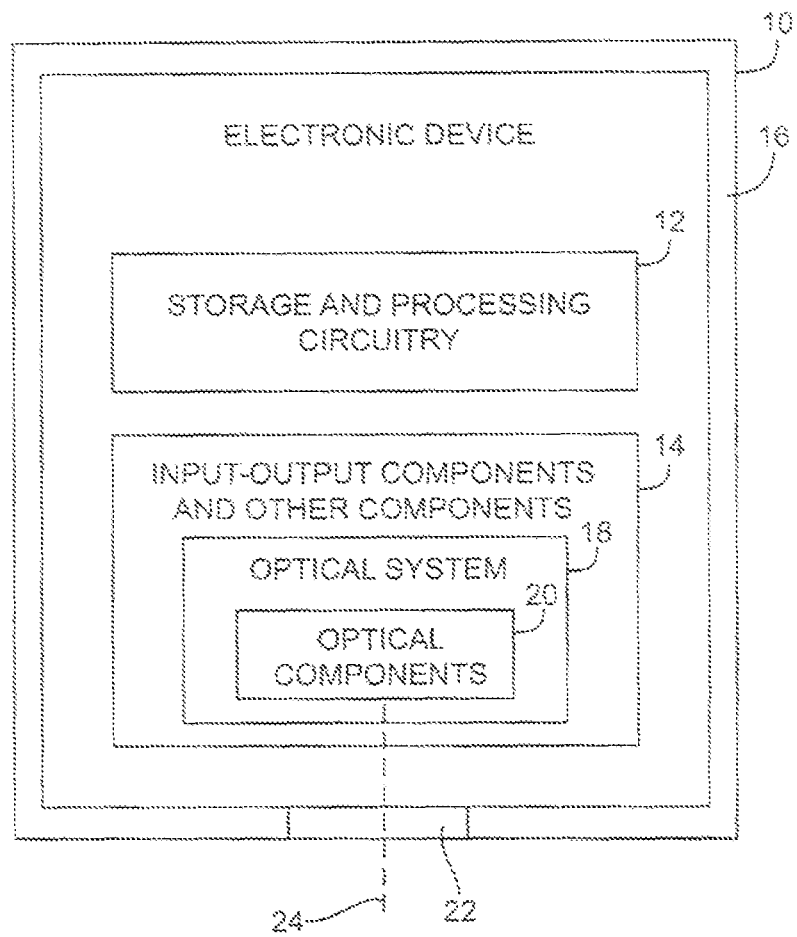
FIG. 1 is a schematic diagram of an illustrative electronic device in accordance with an embodiment of the present invention.

An illustrative electronic device that may be provided with mechanical and electrical features to improve performance, aesthetics, robustness, and size is shown in FIG. 1. As shown in FIG. 1, device 10 may include storage and processing circuitry 12. Storage and processing circuitry 12 may include one or more different types of storage such as hard disk drive storage, nonvolatile memory (e.g., flash memory or other electrically-programmable-read-only memory), volatile memory (e.g., static or dynamic random-access-memory), etc. Storage and processing circuitry 12 may be used in controlling the operation of device 10. Processing circuitry in circuitry 12 may be based on processors such as microprocessors, microcontrollers, digital signal processors, dedicated processing circuits, power management circuits, audio and video chips, and other suitable integrated circuits.

With one suitable arrangement, storage and processing circuitry 12 may be used to run software on device 10, such as internet browsing applications, voice-over-internet-protocol (VOIP) telephone call applications, email applications, media playback applications, operating system functions, antenna and wireless circuit control functions, etc. Storage and processing circuitry 12 may be used in implementing suitable communications protocols. Communications protocols that may be implemented using storage and processing circuitry 12 include internet protocols, wireless local area network protocols (e.g., IEEE 802.11 protocols—sometimes referred to as Wi-Fi®), protocols for other short-range wireless communications links such as the Bluetooth® protocol, protocols for handling cellular telephone communications services, etc.

Input-output devices 14 may be used to allow data to be supplied to device 10 and to allow data to be provided from device 10 to external devices. Examples of input-output devices 14 that may be used in device 10 include display screens such as touch screens (e.g., liquid crystal displays or organic light-emitting diode displays), buttons, joysticks, click wheels, scrolling wheels, touch pads, key pads, keyboards, microphones, speakers and other devices for creating sound, cameras, sensors, etc. A user can control the operation of device 10 by supplying commands through devices 14 or by supplying commands to device 10 through an accessory that communicates with device 10 through a wireless or wired communications link. Devices 14 or accessories that are in communication with device 10 through a wired or wireless connection may be used to convey visual or sonic information to the user of device 10. Device 10 may include connectors for forming data ports (e.g., for attaching external equipment such as computers, accessories, etc.).

The various components of the electronic device may be surrounded by a housing 16. The housing protects the internal components and may help keep the internal components in their assembled position within the device 10. The housing 16 may also help form part of the outer peripheral look and feel of the device 10, i.e., the ornamental appearance. The housing can be widely varied. For example, the housing can include a variety of external components that utilize a variety of different materials. In one example, at least a portion of the housing includes a translucent/transparent portion through which internal components may optically communicate to the outside world.

In accordance with one embodiment, the device 10 can include an optical system 18. The optical system 18 can for example include optical components 20 that works through a window/opening 22 in the housing 16. The optical components 20 may for example correspond to one or more camera modules. Although situated inside the housing 16, the camera modules may be configured to capture image data outside the device 10 via the window/housings. That is, they have a line of sight that passes through the window/opening 22. The optical components may have an axis such as axis 24 with which they are oriented. The axis may be aligned with the window/opening in order to provide the best possible image capture. By way of example, the window/opening may be associated with a translucent/transparent portion of the housing. In one embodiment, the electronic device 10 include one or more alignment structures for ensuring proper mounting and operation of the optical components 18 relative to the housing 16.

As should be appreciated, proper assembly of an electronic device involves aligning the camera module to the device. If the camera module is skewed relative to the device, a user may have difficulty taking pictures that are not tilted. Improper alignment of the camera module to the electronic device may also block the lens in the camera module.

It would therefore be desirable to be able to provide improved ways in which to align components such as camera modules within electronic devices.

In accordance with one embodiment, the housing may have planar front and rear surfaces. The planar surfaces may include structures such as layers of glass or other transparent planar members. Layers of black ink or other opaque substances may be formed on the transparent planar housing members. Camera windows may be formed in the housing by forming openings in the opaque substance on the transparent planar members. Camera functionality may be provided in the electronic device by mounting camera modules in the electronic device.

To rotationally and laterally align a camera module with respect to a camera window and the electronic device housing, an alignment structure may be mounted to the housing in alignment with the camera window and housing. The camera module may be mounted within the alignment structure. The alignment structure may be formed form a ring-shaped structure with an opening. The opening in the ring-shaped alignment structure may be aligned with the camera window opening when attaching the alignment structure to the housing. The alignment structure and camera module may have mating engagement features that ensure alignment between the camera module and the alignment structure when the camera module is inserted within the alignment structure.

In accordance with an embodiment, an apparatus is provided that includes an electronic device housing structure having a camera window, an alignment structure mounted to the housing structure, and a camera module mounted within the alignment structure.

In accordance with another embodiment, an apparatus is provided that also includes a planar member.

In accordance with another embodiment, an apparatus is provided wherein the planar member includes a transparent member coated with a layer of opaque material.

In accordance with another embodiment, an apparatus is provided wherein the transparent member includes a planar glass layer and wherein the layer of opaque material has an opening that forms the camera window.

In accordance with another embodiment, an apparatus is provided wherein the planar glass layer includes a planar rear housing member in a cellular telephone.

In accordance with another embodiment, an apparatus is provided wherein the alignment structure includes a ring-shaped structure that has an opening that is aligned with the camera window.

In accordance with another embodiment, an apparatus is provided wherein the opening in the ring-shaped structure has a circular shape with a center and wherein the camera window includes a circular opening with a center that is aligned with the center of the circular shape of the ring-shaped structure.

In accordance with another embodiment, an apparatus is provided wherein the camera module has a protrusion and wherein the ring-shaped structure has a notch that mates with the protrusion.

In accordance with another embodiment, an apparatus is provided wherein the camera module has a protruding portion with a cylindrical surface and wherein the ring-shaped structure has at least one protrusion with a cylindrical inner surface contour that mates with the cylindrical surface.

In accordance with another embodiment, an apparatus is provided wherein the electronic device housing structure includes a glass plate with a layer of opaque ink, wherein the layer of opaque ink has an opening that forms the camera window, and wherein the alignment structure has an opening that is aligned with the opening in the layer of opaque ink.

In accordance with another embodiment, an apparatus is provided wherein the camera module includes a protruding portion having at least one engagement structure and wherein the alignment structure receives the protruding portion and mates with the engagement structure to ensure that the camera module is aligned to the alignment structure.

In accordance with an embodiment, an electronic device is provided that includes a housing having a planar surface surrounded by four sidewall edges, a camera window in the rear surface, an alignment structure mounted to the planar surface, wherein the alignment structure surrounds the camera window and is rotationally aligned with respect to the four sidewall edges of the housing, and a camera module having at least one engagement feature that mates with the alignment structure.

In accordance with another embodiment, an electronic device is provided wherein the camera module includes a cylindrical protrusion and wherein the alignment structure receives the cylindrical protrusion to align the camera module relative to the alignment structure.

In accordance with another embodiment, an electronic device is provided wherein the alignment structure includes a ring-shaped member that is attached to the planar surface of the housing adhesive.

In accordance with another embodiment, an electronic device is provided that further includes a planar transparent member that forms the planar surface of the housing.

In accordance with another embodiment, an electronic device is provided that further includes a layer of opaque material on the planar transparent member that forms the camera window.

In accordance with another embodiment, an electronic device is provided wherein the alignment structure has a notch and wherein the cylindrical protrusion has a tab that mates with the notch.

In accordance with an embodiment, a method of aligning a camera module with respect to a camera window in an electronic device housing is provided that includes mounting an alignment structure to the electronic device housing at the camera window in rotational alignment with the electronic device housing, and mounting the camera module within the alignment structure in rotational alignment with the alignment structure and the electronic device housing by engaging a camera module engagement feature with the alignment structure.

In accordance with another embodiment a method is provided wherein the alignment structure has an opening and wherein mounting the alignment structure to the electronic device housing includes aligning the opening with the camera window.

In accordance with another embodiment a method is provided, wherein the camera module engagement feature includes a radially extending tab, wherein mounting the alignment structure to the electronic device housing includes attaching a ring-shaped alignment structure to a planar housing member using adhesive, and wherein mounting the camera module within the alignment structure includes mounting the camera module within the alignment structure so that the radially extending tab engages a mating notch in the alignment structure and rotationally aligns the camera module to the alignment structure.

In accordance with these embodiments, electronic devices may be provided with components that require alignment.

As an example, an electronic device may have a camera module. The camera module may include an image sensor and a lens. The image sensor may be an integrated circuit that contains a two-dimensional array of image pixels that gather digital images. The lens and the image sensor may be mounted in a camera module housing. The camera module housing may be, for example, a cube-shaped plastic housing. Optional additional circuitry such as an image processing chip or other circuits may be mounted within the housing of the camera module.

For proper operation of the camera module, the camera module should be installed within the electronic device so that the camera lens is not blocked. If, for example, the electronic device has a transparent camera window, the lens of the camera module should be aligned with the camera window. To ensure that acquired images are not undesirably tilted, the camera module should also be rotationally aligned with respect to the camera.

Other components may likewise require proper alignment to an electronic device. For clarity, the alignment of components such as camera modules is sometimes described herein as an example. This is, however, merely illustrative. Any suitable component may be aligned with respect to an electronic device, if desired.

To ensure proper alignment of a camera module or other component with respect to an electronic device, an alignment structure may be mounted within the electronic device. For example, an alignment structure may be mounted to a rear glass plate or other structure associated with the housing of the electronic device. The camera module may be mounted in alignment with the electronic device using the alignment structure. The alignment structure and the camera module (or other component) may, for example, have mating features that ensure proper alignment between the camera module and the alignment structure. By ensuring that the alignment structure is mounted in the electronic device with a proper orientation, the proper orientation of the camera module to the electronic device is obtained.

Any suitable electronic device may be provided with alignment structures such as these. As an example, alignment structures of this type may be used in electronic devices such as cameras, handheld computers, tablet computers, computers integrated into computer monitor housings, laptop computers, set-top boxes, gaming devices, wrist watch devices, pendant devices, cellular telephones, etc. With one suitable configuration, alignment structures such as camera module alignment structures are provided in relatively compact electronic devices such as portable electronic devices.

These and other embodiments will be described in greater detail below.

An illustrative portable electronic device is shown in FIG. 2. As shown in FIG. 2, portable electronic device 10 may include a housing 1012. Housing 1012, which is sometimes referred to as a case, may be formed of any suitable materials including, plastic, glass, ceramics, carbon-fiber composites and other composites, metal, other suitable materials, or a combination of these materials. A unibody construction may be used for device 10 in which case some or all of housing 1012 may be formed from a single piece of material. Housing 1012 may, for example, be formed from a piece of plastic or metal that covers the sidewalls of device 10 and that covers the rear surface of device 10. Frame members and other components may be mounted in the unibody housing. With another illustrative arrangement, housing 1012 may be implemented using multiple structures that are assembled together. For example, housing 1012 may be formed from a central frame 1012A to which a front and/or rear panels 1012B and 1012C are attached (as an example). In some cases, the front and/or rear panels may include an outer transparent layer (e.g., cover glass). Other configurations may be used if desired. In one embodiment, the panels may be removable. For example, the rear panel may be detached from the rest of the housing in order to provide internal access to the electronic device. In one example, the rear panel is made to slide relative to the rest of the housing between a closed position, enclosing the device, and an open position, providing an opening.

The device may also include a display 1014 situated in front panel 1012B. In some cases, the front panel 1012B can be configured to cover both active and/or inactive portions of the front surface of device 10. Display 1014 may, for example, be a touch screen that incorporates capacitive touch electrodes. Display 1014 may include a central active region of front panel 1012B such as active region 1217. Display 1014 may include image pixels formed form light-emitting diodes (LEDs), organic LEDs (OLEDs), plasma cells, electronic ink elements, liquid crystal display (LCD) components, or other suitable image pixel structures. Edge portions such as regions 1221 of front panel 1012B may be inactive. In some cases, the underside of a transparent front panel in the inactive regions 1221 may be coated with an opaque coating such as an opaque ink. An opening may be formed in the opaque ink to serve as a display window for display 1014. A similar configuration can be provided for the rear panel whether or not another display is used, i.e., the rear panel may be formed with a transparent member with an opaque coating.

The device may include a variety of I/O components including for example buttons, connectors, jacks, receivers, speakers and/or the like.

In one embodiment, device 10 may also include one or more cameras. Cameras may be implemented, for example, by mounting camera modules within the housing of device 10.

Figure 2A:
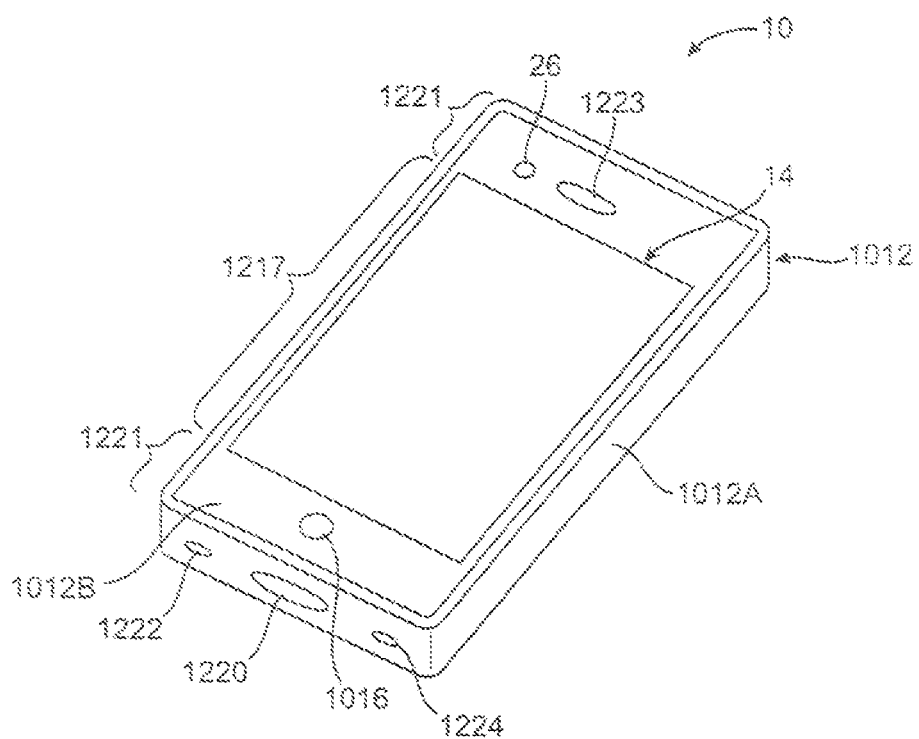
FIG. 2A is a front perspective view of an illustrative electronic device with a component such as a camera module that is aligned with respect to the electronic device in accordance with an embodiment of the present invention.
Figure 2B:
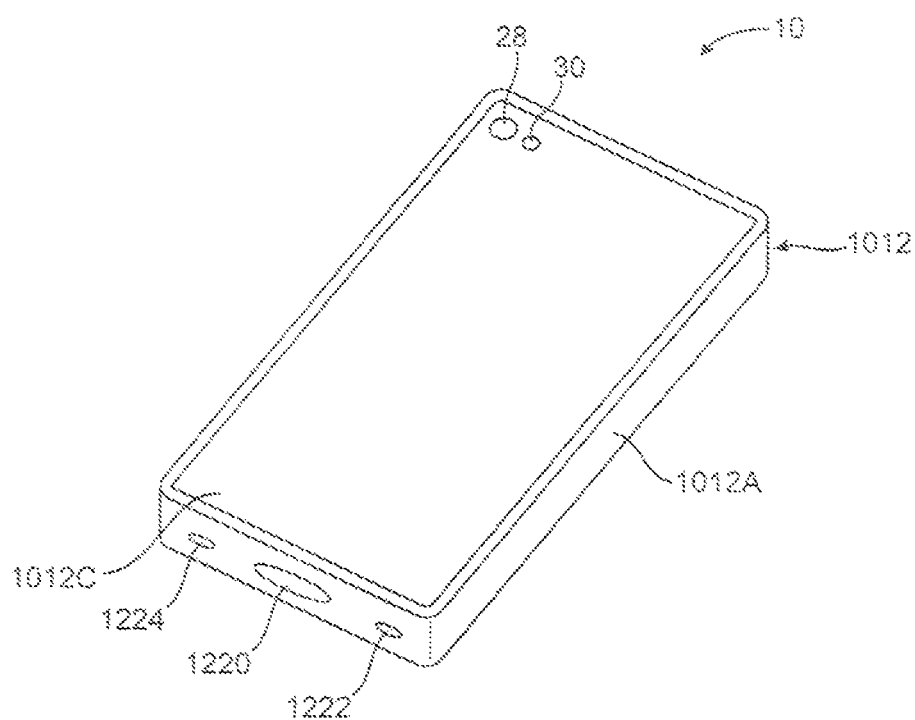
FIG. 2B is a rear perspective view of an illustrative electronic device with a component such as a camera module that is aligned with respect to the electronic device in accordance with an embodiment of the present invention.

In one embodiment (as shown in FIG. 2A), device may include front-facing camera 26. Front facing cameras may for example be mounted behind the front panel that covers display 1014. Alternatively or additionally (as shown in FIG. 2B), device may include rear-facing camera 28. Rear facing cameras may be mounted in device 10 behind the rear panel of device 10. In other suitable configurations, the housing of device 10 may be formed from a plastic or metal housing in which a transparent plastic or glass camera window structure has been mounted. In this type of arrangement, camera modules may be mounted behind the window structure.

A front-facing camera 26 may be implemented by mounting a camera module below the front panel in alignment with the camera window. As discussed above, the front of device 10 may be provided with a transparent member coated with an opaque substance such as opaque ink. The transparent member may have a camera window formed by an opening in the opaque ink. A similar configuration may be provided by the rear panel.

Alignment schemes that involve aligning a camera module with respect to a camera window formed form an opening in a layer of opaque ink on a transparent layer are sometimes described herein as an example. In general, however, camera modules may be aligned to camera windows of any suitable type.

Figure 3:
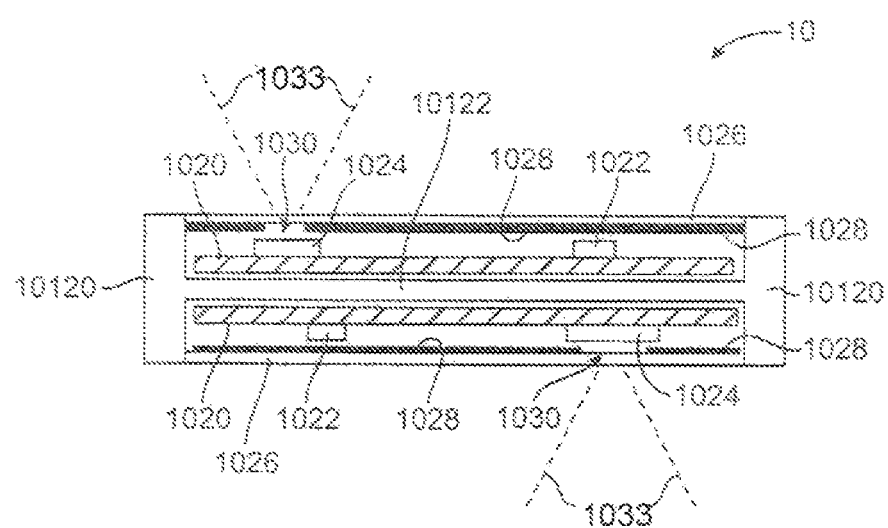
FIG. 3 is a cross-sectional end view of an illustrative electronic device of the type shown in FIG. 1 in accordance with an embodiment of the present invention.

A cross-sectional side view of device 10 of FIG. 2 is shown in FIG. 3. As shown in FIG. 3, housing 1012 may include sidewall structures such as housing sidewall structures 120. Structures 10120 may be implemented using a metal ring-shaped member that substantially surrounds the rectangular periphery of display 1014. Structures of this type are sometimes said to form a band around the periphery of device 10, so sidewall structures 10120 may sometimes be referred to as band structures, a band member, or a band. Structures 10120 may be formed from a metal such as stainless steel, aluminum, or other suitable materials. One, two, or more than two separate structures may be used in forming structures 10120. Structures 10120 may serve as a bezel that surrounds and/or holds display 1014 on the front (top) face of device 10. Structures 10120 are therefore sometimes referred to herein as bezel structures 10120 or bezel 10120.

Band 10120 runs around the rectangular periphery of device 10 and display 1014. Band 10120 may be confined to the upper portions of device 10 (i.e., peripheral regions that lie near the surface of display 1014) or may cover the entire vertical height of the sidewalls of device 10 (e.g., as shown in the example of FIG. 2). Other configurations are also possible such as configurations in which band 10120 or other sidewall structures are partly or fully integrated with the rear wall of housing 1012 (e.g., in a unibody-type construction).

As shown in FIG. 3, display 1014 may be mounted to band 10120 of housing 1012 using mounting structure 1018. Mounting structure 1018 may be, for example, a plastic frame. On the rear of housing 1012, device 10 may have a planar glass member such as glass member 1026. Glass member 1026 may be coated with a layer of opaque material such as black ink 1028. Opening 1030 in black ink 1028 may serve as a camera window.

Device 10 may include internal housing structures that support band 10120. For example, internal metal plate 10122 may be welded or otherwise attached between left-edge and right-edge segments of band 10120. Plate 10122 may help support band 10120. Printed circuit boards 1020 may be mounted within device 10. For example, printed circuit boards 1020 may be mounted on plate 10122. Components 1022 such as integrated circuits, switches, input-output port connectors, discrete components, and other circuitry and devices may be mounted to printed circuit boards 1020. The components that are mounted or otherwise electrically connected to printed circuit boards 1020 may include a camera module such as camera module 1024.

For proper operation, camera module 1024 may be mounted behind opening 1030 in rotational alignment with the edges of device 10. Dashed lines 1033 illustrated a possible angle of view of camera module 1024 after camera module 1024 has been mounted in device 10.

Device 10 may be provided with one or more cameras. In the example of FIG. 3, two cameras 1024 are shown that may be used, for example, for front-facing camera 26 of FIG. 2A and rear-facing camera 28 of FIG. 2B.

Figure 4:
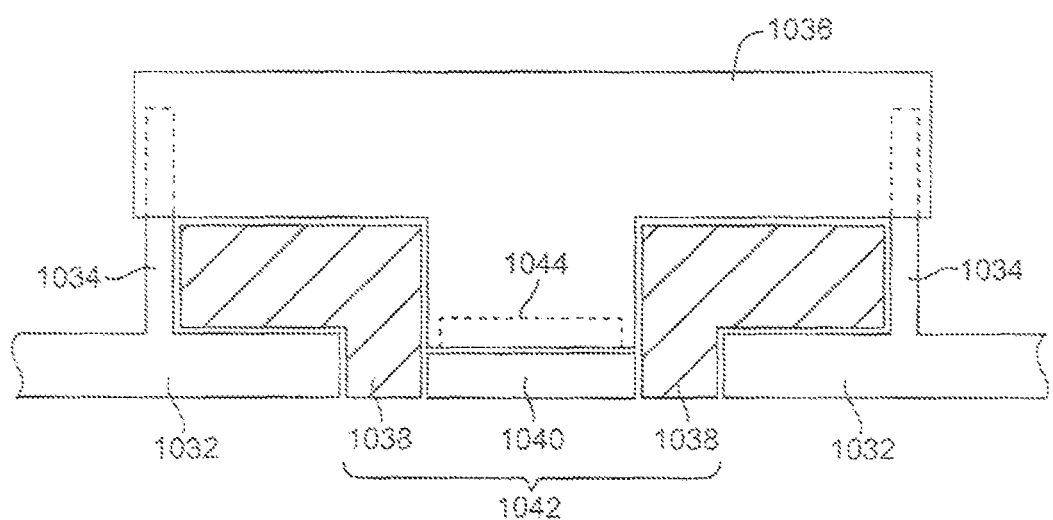
FIG. 4 is a cross-sectional view of a conventional camera module alignment arrangement in a cellular telephone with a plastic housing.

A cross-sectional side view of a conventional camera module mounting arrangement in a cellular telephone. As shown in FIG. 4, rear plastic housing wall 1032 of the cellular telephone has circular opening 1042. Chrome bezel 1038 lines the inner surface of opening 1042. Camera module 1036 has lens 1044. Alignment structures 1034 are formed as an integral portion of rear plastic housing wall 1032. Camera module 1036 has alignment structures that engage structures 1034. This laterally and rotationally aligns camera module 1036 and lens 1044 within hole 1042.

Arrangements of the type shown in FIG. 4 may not always be satisfactory. For example, arrangements of the type shown in FIG. 4 may be difficult or impossible to implement in devices that have glass rear surfaces such as planar glass member 1026 of FIG. 3.

Figure 5:
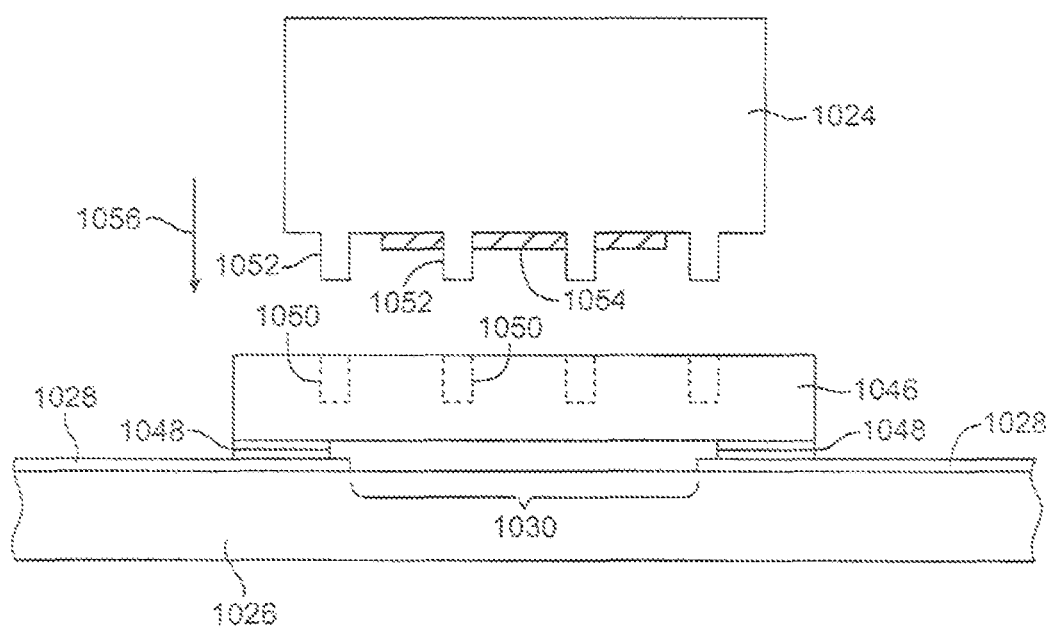
FIG. 5 is a side view of a portion of the interior of an electronic device and an associated camera module showing how an alignment structure may be aligned to a device housing structure and showing how the camera module can be aligned to the alignment structure in accordance with an embodiment of the present invention.

To accurately align a component such as camera module 1024 within device 10 of FIG. 2, an alignment structure may be mounted to glass plate 1026. Camera module 1024 may then be mounted in the alignment structure. This type of arrangement is shown in FIG. 5. As shown in FIG. 5, glass plate 1026 may include a layer of ink such as black ink 1028. Opening 1030 may have a circular shape and may serve as a camera window for camera module 1024.

Alignment structure 1046 may be mounted on glass 1026 in alignment with device 10 and camera window 1030. For example, alignment structure 1046 may be attached to glass 1026 using adhesive 1048. Alignment structure 1046 may also be attached to glass 1026 or other suitable portions of housing 1012 or device 10 using clips, springs, screws, other fasteners, solder, welds, etc.

Alignment structure 1046 may have one or more alignment features such as features 1050. Features 1050 may be, for example, protrusions, recesses, notches, grooves, ribs, tabs, or other suitable structures. Features 1050 may be configured to form engagement structures that engage with features such as features 1052 on camera module. Features 1052 may be protrusions, recesses, notches, grooves, ribs, tabs, or other suitable structures that are capable of mating with features 1050 on alignment structure 1046.

When camera module 1024 is moved in direction 1056 to mount camera 1024 against glass plate 1026, features 1052 may engage with features 1050. When features 1050 engage with features 1052 during the mounting of camera module 1024 to alignment structure 1046, camera module 1024 becomes aligned to alignment structure 1046. Because alignment structure 1046 is aligned to camera window 1030 and device 10, camera module 1024 and camera lens 1054 in camera module 1024 become aligned with camera window 1030 (i.e., the center of lens 1054 becomes aligned with the center of opening 1030). Rotational alignment is also achieved using this approach, so that images captured by camera module 1024 will not appear tilted to a user of device 10. This is because the edges of the image sensor chip in module 1024 will not be tilted with respect to the edges of the housing of device 10.

Figure 6:
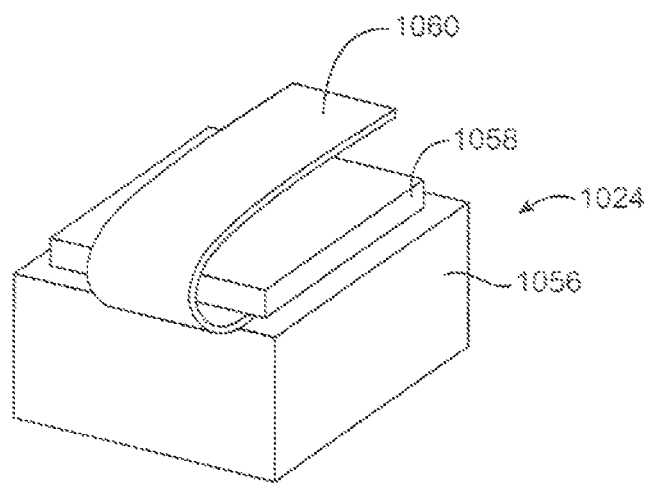
FIG. 6 is a perspective view of an illustrative camera module that may be mounted within an electronic device using an arrangement of the type shown in FIG. 5 in accordance with an embodiment of the present invention.

A bottom perspective view of an illustrative camera module is shown in FIG. 6. As shown in FIG. 6, camera module 1024 may have a camera module housing 1056 and a flex circuit tail such as tail 1060. Tail 1060 may be formed from a flexible polymer sheet such as a sheet of polyimide. A signal path may be formed from patterned metal traces on the flexible polymer sheet. Tail 1060 may be connected to a printed circuit board such as one of boards 1020 in the example of FIG. 3. Foam pad 1058 may be used in biasing camera module 1024 in place within alignment structure 46 and device 10.

Figure 7:
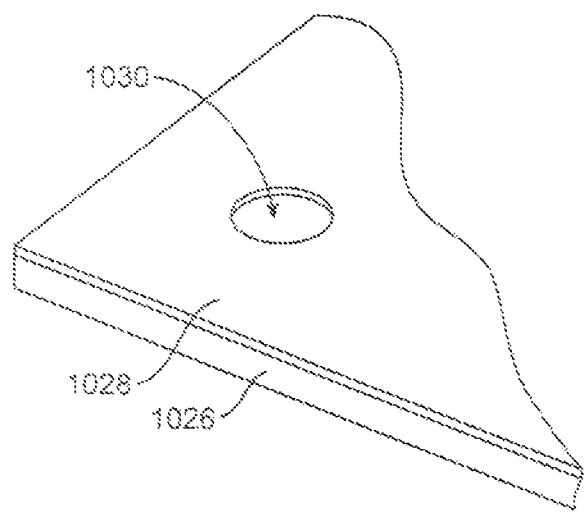
FIG. 7 is perspective view of a layer of glass or other device structure that may be provided with a camera window such as a window formed from an opening in a layer of opaque ink in accordance with an embodiment of the present invention.

FIG. 7 is a perspective view of a portion of glass plate 1026. Plate 1026 may be coated with an opaque substance such as black ink layer 1028. Camera window 1030 may be formed from a circular opening or other suitable opening in ink 1028. If desired, plate 1026 may be formed from a transparent plastic rear housing structure or other suitable clear planar housing members. In another suitable arrangement, plate 1026 may be part of an opaque housing structure and opening 1030 may be formed by installing a clear plastic or glass window within an opening in the opaque housing.

Figure 8:
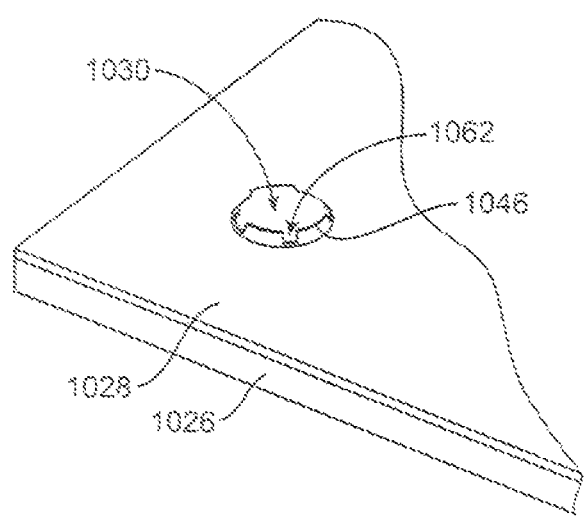
FIG. 8 is a perspective view of the device structure of FIG. 7 showing how a ring-shaped alignment structure with engagement features may be mounted to the device structure around the camera window in accordance with an embodiment of the present invention.

FIG. 8 shows how alignment structure 1046 may be mounted to glass plate 1026 surrounding opening 1030. Alignment structure 1046 may be formed from metal, plastic, other materials, or combinations of these materials. Alignment structure 1046 may have a circular shape of the type shown in FIG. 8 or may have other suitable shapes (e.g., rectangular shapes, shapes with straight and curved edges, hexagonal shapes, oval shapes, etc.). In the FIG. 8 example, alignment structure 1046 has a circular (ring) shape with a circular periphery and a circular opening. The circular opening of alignment structure 1046 is preferably large enough to surround camera window 1030 without blocking any of camera window 1030. Notches such as notch 1062 or other alignment features may be provided in alignment structure 1046 to facilitate subsequent alignment of camera module 1024.

Figure 9:
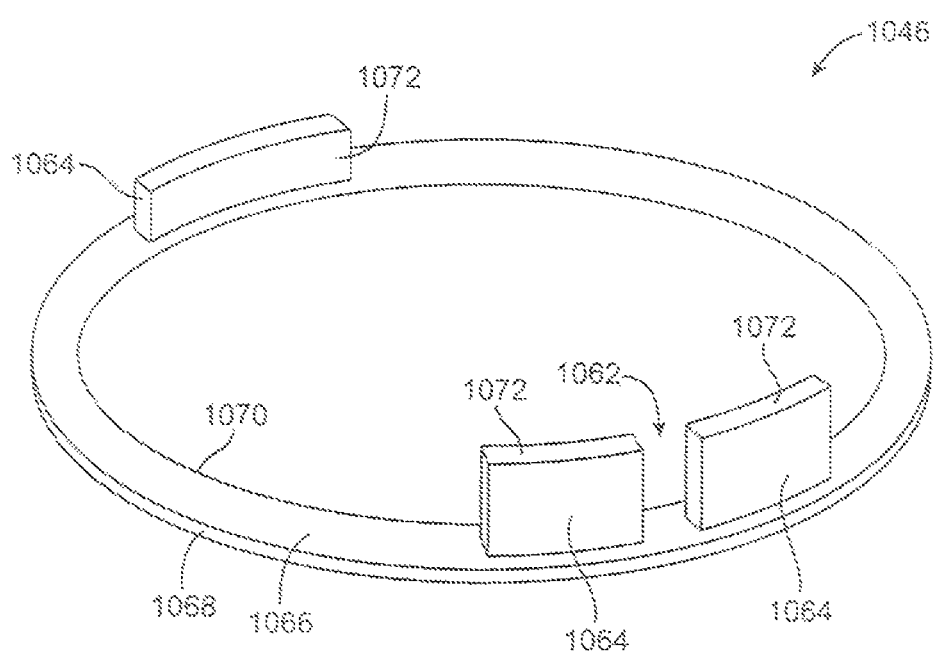
FIG. 9 is a perspective view of an illustrative ring-shaped camera module alignment structure in accordance with an embodiment of the present invention.

FIG. 9 shows an illustrative alignment structure that may be mounted at opening 1030. As shown in FIG. 9, notch 1062 may be formed by a gap between adjacent protrusions such as protrusions 1064. Protrusions 1064 may be formed as an integral portion of circular base structure 1066. Base structure 1066 may be implemented using a ring-shaped member that has a circular outer edge such as edge 1068 and a circular inner edge such as edge 1070. Because edge 1070 of the inner surface of ring 1066 is circular, alignment structures such as alignment structure 1046 of FIG. 9 may be suitable for mounting over circular camera window openings such as circular opening 1030 of FIG. 8. If desired, alignment structure 1046 may have non-circular opening shapes such as oval shapes (formed when inner edge 1070 follows an oval path), rectangular shapes (formed when inner edge 1070 has four edges), etc. The outer periphery of alignment structure 1046 may also have different suitable shapes. For example, outer edge 1068 may trace a path that is circular, oval, rectangular, hexagonal, etc. The use of an alignment structure that has a circular footprint may help to minimize the amount of space that is consumed within device 10 when attaching alignment structure 1046 to plate 1026. The use of other shapes may help enhance manufacturability.

There may be any suitable number of notches such as notch 1062 in alignment structure 1046. The use of a single notch in the arrangement of FIG. 9 is merely illustrative. Moreover, other types of engagement features may be formed on alignment structure 1046 (e.g., ribs, grooves, openings, recesses, protrusions, etc.). The use of the notch-shaped opening for engagement feature 1062 of FIG. 9 is shown as an example.

Figure 10:
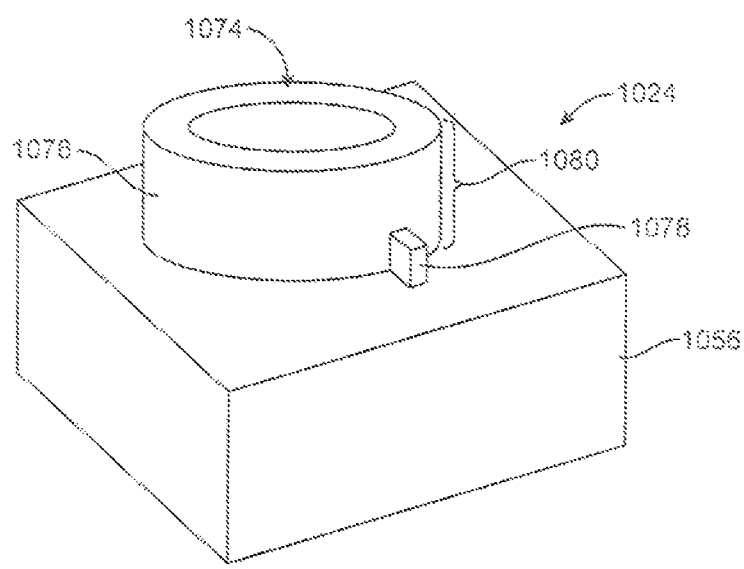
FIG. 10 is a perspective view of an illustrative camera module having an engagement feature that is configured to mate with an engagement feature in a ring-shaped camera module alignment structure of the type shown in FIG. 9 in accordance with an embodiment of the present invention.

Camera module 1024 may have a cube-shaped housing such as housing 1056 of FIG. 10 or may have housings of other shapes. Lens 1074 may be mounted on a cylindrical protruding portion of housing 1056 such as cylindrical protrusion 1080. Protrusion 1080 may have an engagement feature such as radially extending tab 1078 that mates with an alignment feature in alignment structure 1046 (FIG. 9) such as notch 1062. There may be one, two, three, or more than three engagement features on camera module 1026. The arrangement of FIG. 10 is merely illustrative.

As shown in FIG. 10, portion 1080 of camera module housing 1056 may have a cylindrical shape (as an example). As a result of the cylindrical shape of housing portion 1080, outer surface 1076 of housing portion 80 is cylindrical. The cylindrical shape of surface 1076 may mate with the cylindrical shape of mating inner surface 1072 of protrusions 1064 in alignment structure 1046. If desired, this mating relationship may be accomplished using camera module housings and alignment structures of different shapes. For example, inner surface 1072 of alignment structure 1046 may have planar portions and outer surface 1076 of housing 1056 may have corresponding planar portions. The arrangement shown in FIGS. 9 and 10 in which inner surface 1072 of alignment structure 1046 follows a cylindrical contour and in which outer surface 1076 follows a cylindrical contour is merely illustrative. Mating surfaces of any suitable shape may be used in alignment structure 1046 and camera module 1024.

As this example demonstrates, alignment structure 1046 and camera module 1024 may have portions that define the lateral position of camera module 1024 relative to alignment structure 1046 (e.g., mating cylindrical surfaces such as surface 1072 and surface 1076) and portions that define the rotational position of camera module 1024 relative to alignment structure 1046 (e.g., matching engagement features such as tab 1078 and notch 1062). During assembly operations, alignment structure 1046 can initially be laterally aligned relative to opening 1030 in planar member 1026 and can be rotationally aligned to the edges of housing 1012. Camera module 1024 may then be mounted to alignment structure 1046. During mounting of the camera module to alignment structure 1046, surfaces 1072 and 1076 may help ensure proper lateral alignment of camera module 1024 and engagement features 1078 and 1062 may help ensure proper rotational alignment of camera module 1024.

Figure 11:
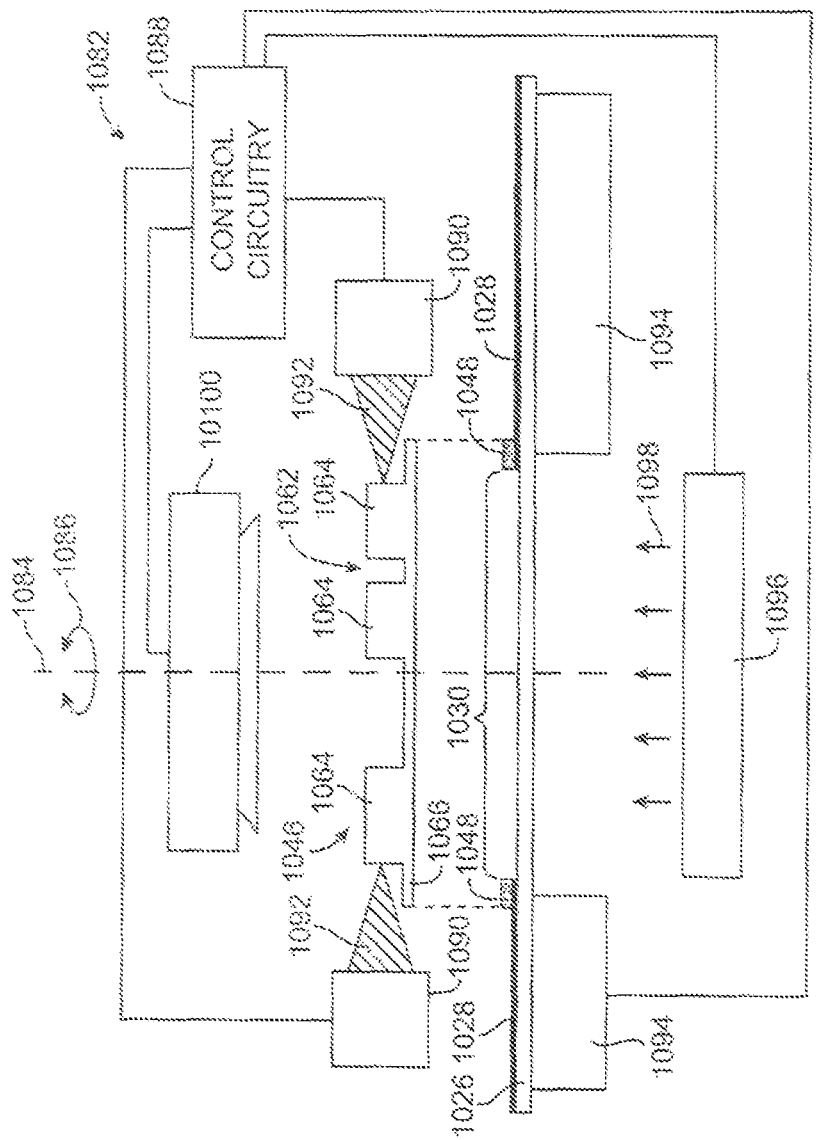
FIG. 11 is a side view of a system in which camera alignment structures are aligned and mounted on a planar glass structure or other structures in an electronic device and in which a camera module is aligned and mounted to the alignment structures in accordance with an embodiment of the present invention.

Assembly operations may be performed manually, using automated (computer-controlled) equipment, or using a combination of manual and automated techniques. An illustrative assembly tool that uses electronically controlled positioning stages is shown in FIG. 11. As shown in FIG. 11, the operation of tool 1082 may be controlled using control circuitry 1088. Control circuitry 1088 may include one or more computers, positioning stage controller circuitry, and other hardware for controlling the operation of tool 1082. An operator may input commands to control circuitry 1088 using a keyboard, mouse, touch screen, or other user interface equipment (e.g., circuitry 1088). In response, control circuitry 1088 may issue commands to positioning stages such as positioning stages 1090 and positioning stages 1094. Control circuitry 1088 may also issue commands to positioning stages 1090 and 1094 automatically (i.e., in response to control code running on processors in circuitry 1088).

Camera 10100 may be used, for example, in capturing digital images for tool 1082. Illumination source 1096 may provide light 1098 that passes through opening 1030 in plate 1026. Camera 10100 may capture images of opening 1030 and structure 1046. Control circuitry 1088 may process captured image data to determine how to control the position of alignment structure 1046 relative to opening 1030 and plate 1026.

Positioning stages 1094 and 1090 may move horizontally and vertically (i.e., in three orthogonal dimensions X, Y, and Z) and rotationally (e.g., by rotating in directions 1086 about rotational axis 1084 in the center of opening 1030). Alignment structure 1046 may be mounted in positioning stage 1090 using mounting members 1092. By controlling positioning stages 1090, the lateral position (i.e., the horizontal X-Y position) of alignment structure 1046, the vertical position (i.e., the vertical Z position) of alignment structure 1046, and the rotational position about axis 1084 of alignment structure 1046 may be controlled. Plate 1026 may be mounted on stages 1094. Positioning stages 1094 may be used to control the lateral, vertical, and rotational position of plate 1026.

By gathering information on the position of structure 1046, plate 1026, and opening 1030 using camera 10100, control circuitry 1088 can automatically determine what types of position adjustments should be made to align structure 1046. Structure 1046 may then be moved vertically towards plate 1026 so that structure 1046 may be mounted on plate 1026 (e.g., using a ring of adhesive such as adhesive 1048). After structure 1046 has been mounted to plate 1026, camera module 1024 may be positioned in structure 1046 using positioning stages 1090 and 1094.

Figure 12:
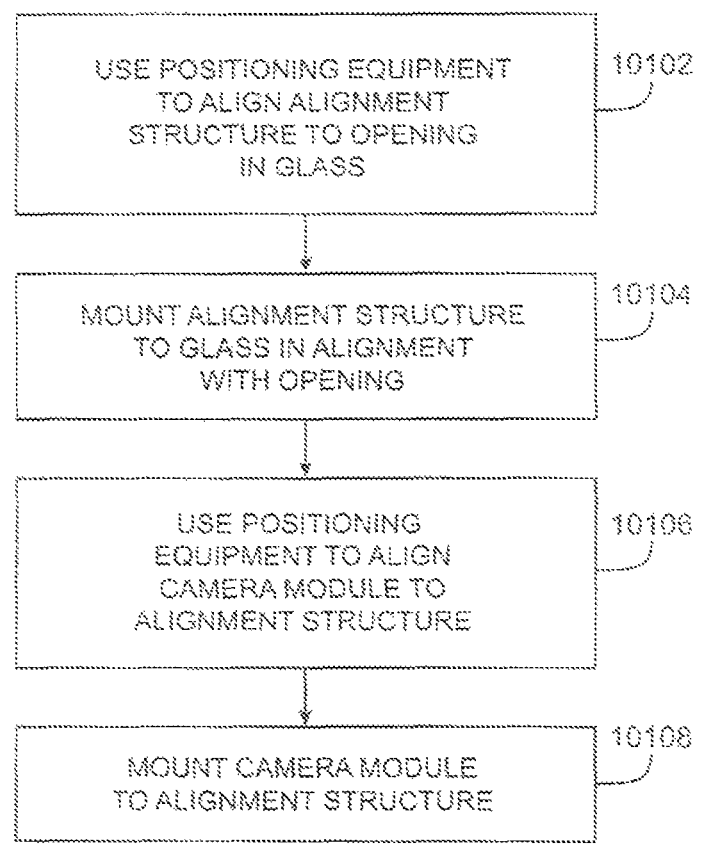
FIG. 12 if a flow chart of illustrative steps involved in assembling an electronic device that contains a component such as a camera module using an alignment structure that is mounted to a glass plate or other structure in the electronic device in accordance with an embodiment of the present invention.

Illustrative operations involved in assembling device 10 are shown in FIG. 12. At step 10102, equipment such as equipment 1082 of FIG. 11 may be used in aligning alignment structure 1046 with hole 1030. For example, equipment 1082 may be used to adjust the lateral position of alignment structure 1046 until the center of the circular opening in alignment structure 1046 is aligned with the center of circular opening 1030 in ink layer 1028 on plate 1026. The alignment operations of step 10102 may also involve adjusting the rotational alignment of structure 1046 (i.e., so that notch 1062 or other engagement structures are positioned in a desired angular orientation with respect to the edges of plate 1026).

After alignment structure 1046 has been laterally and rotationally aligned with respect to plate 1026 and opening 1030, equipment 1082 may be used to mount structure 1046 to plate 1026 at step 10104 (e.g., using adhesive 1048).

At step 10106, equipment 1082 may be used to align camera module 1024 with respect to alignment structure 1046. In particular, stages 1090 and 1094 may be used to adjust the lateral and rotational orientation of camera module 1024 until cylindrical surface 1076 is laterally aligned with surfaces 1072 of alignment structure 1046 and until rotational alignment features such as tab 1078 are aligned with features such as notch 1062.

After camera module 1024 has been aligned to alignment structure 1046 in this way, positioning stages 1090 and 1094 may be used to insert camera module 24 into alignment structure 1046. Once mounted in this way, inner cylindrical surfaces 1072 on structure 1046 will mate with outer surface 1076 on camera module 1024 and engagement feature 1062 on structure 1046 will receive engagement feature 1078 on camera module 1024, thereby ensuring proper lateral and rotational alignment of camera module 1024 relative to camera window opening 1030 and device 10. Adhesive, press-fit structures, fasteners, biasing members such as foam 1058 (FIG. 6), and/or other mounting techniques may be used in mounting camera module 1024 within alignment structure 1046 (step 108).

In devices with parts that move relative to each other during assembly, the camera may become dislodged or misaligned during assembly operations. Conventional arrangements may also place unwanted stresses on device components. If care is not taken, the camera will not be oriented properly within the device, leading to camera performance problems.

It would therefore be desirable to be able to provide an electronic device with improved camera mounting structures.

in accordance with one embodiment, the housing may have a peripheral band-shaped structure formed from a material such as metal. A display may be formed on a front surface of the housing. A planar rear surface member such as a layer of glass may be attached to a rear surface of the housing.

The planar rear surface member may be formed from plastic, glass, or other materials. When formed from a transparent material such as clear glass, the planar rear surface member may be provided with an inner layer of an opaque substance such as ink. An opening may be formed in the ink to serve as a camera window for the electronic device. When the planar rear surface member or housing wall structure is formed from plastic or metal, a clear glass or plastic camera window structure may be used as a camera window.

Alignment structures may be used to ensure that the camera module is rotationally and translationally aligned with respect to the electronic device. The camera module may have a lens through which images are captured. When mounted within the housing of the electronic device, the alignment structures help ensure that the camera module lens is aligned with the camera window.

The alignment structures may be implemented using a structure such as a plastic plate member with sidewalls. The plate member may be attached to the rear surface member. The sidewalls of the plate may form an alignment groove. The planar surface of the rear surface member may also form an alignment surface. The alignment groove may have a sidewall that bears against a protruding portion of the camera module such as a flash unit, thereby rotating the camera module into alignment. Another sidewall may be angled to form a guiding ramp that helps the groove receive the camera module.

Biasing members such a foam and springs may be used to bias the camera module into position within the alignment structures.

If desired, the alignment structures may be formed using hook-shaped members that mate with corresponding protrusions on the camera module. The hook-shaped members and the mating protrusions may have angled surfaces that help bias the camera module towards the rear surface member and thereby relieve pressure from an associated biasing member.

In accordance with an embodiment, an electronic device is provided that includes a camera module; and alignment structures having portions that mate with the camera module and that rotationally and laterally align the camera module with respect to the electronic device.

In accordance with another embodiment, an electronic device is provided that also includes a planar rear surface member, wherein the alignment structures are attached to the planar rear surface member.

In accordance with another embodiment, an electronic device is provided wherein the alignment structures include sidewalls forming an alignment groove that guides the camera module into alignment with the electronic device.

In accordance with another embodiment, an electronic device is provided that also includes a biasing structure that biases the camera module against at least one of the sidewalls.

In accordance with another embodiment, an electronic device is provided wherein the camera module has a protruding structure that bears against a given one of the sidewalls.

In accordance with another embodiment, an electronic device is provided wherein the electronic device includes foam that biases the camera module against the planar rear surface member.

In accordance with another embodiment, an electronic device is provided that also includes a printed circuit board; and at least one spring between the camera module and the printed circuit board.

In accordance with another embodiment, an electronic device is provided wherein the alignment structures include hook-shaped structures.

In accordance with another embodiment, an electronic device is provided wherein the camera module includes a pair of protrusions that mate with the hook-shaped structures when the camera module is aligned with the electronic device.

In accordance with another embodiment, an electronic device is provided wherein the planar rear surface member includes a layer of glass.

In accordance with another embodiment, an electronic device is provided wherein the planar rear surface member includes a layer of ink with a camera opening and wherein the camera module has a lens that is aligned with the camera opening.

In accordance with an embodiment, an electronic device is provided that includes housing structures, and a camera module mounted to the housing structures, wherein the camera module includes a base structure having sidewalls, imaging components disposed in the base structure, and at least one protruding structure on the sidewalls of the base structure that engages with the housing structures.

In accordance with another embodiment, an electronic device is provided wherein the at least one protruding structure includes a pair of protruding alignment structures and wherein the housing structures include a pair of hook structures with openings that receive the protruding alignment structures.

In accordance with another embodiment, an electronic device is provided wherein the housing structures have sidewalls forming an alignment groove.

In accordance with another embodiment, an electronic device is provided wherein one of the sidewalls is angled to form a guiding ramp that receives the camera module.

In accordance with another embodiment, an electronic device is provided wherein the housing structures include at least one glass member and at least one hook structure attached to the glass member that mates with the at least one protruding structure.

In accordance with an embodiment, an electronic device is provided that includes a housing, a display on a front surface of the housing, a planar rear member on a rear surface of the housing, wherein the planar rear member has a camera window, camera alignment structures attached to the planar rear member, and a camera module having a lens, wherein the camera module is received within the camera alignment structures so that the lens is aligned with the camera window and so that the camera module is rotationally aligned with respect to the housing.

In accordance with another embodiment, an electronic device is provided wherein the camera module includes a protruding flash unit and wherein the camera alignment structures includes a groove having at least one sidewall that bears against the protruding flash unit.

In accordance with another embodiment, an electronic device is provided that also includes ink on the planar rear member that surrounds the camera window, wherein the camera alignments structures includes sidewalls including at least one angled sidewall that forms a guiding ramp that receives the camera module.

In accordance with another embodiment, an electronic device is provided that also includes a foam gasket that is compressed between the planar rear member and the camera module.

In accordance with these embodiments, cameras may be used in electronic devices to capture still images and video clips. The electronic devices in which the cameras are used may be portable electronic devices such as laptop computers or small portable computers of the type that are sometimes referred to as ultraportables. Portable electronic devices may also be somewhat smaller devices. Examples of smaller portable electronic devices include wrist-watch devices, pendant devices, headphone and earpiece devices, and other wearable and miniature devices.

If desired, the electronic devices in which the cameras are provided may be, for example, handheld wireless devices such as cellular telephones, media players with wireless communications capabilities, handheld computers (also sometimes called personal digital assistants), remote controllers, global positioning system (GPS) devices, and handheld gaming devices. The electronic devices may also be hybrid devices that combine the functionality of multiple conventional devices. Examples of hybrid portable electronic devices include a cellular telephone that includes media player functionality, a gaming device that includes wireless communications capabilities, a cellular telephone that includes game and email functions, and a portable device that receives email, supports mobile telephone calls, has music player functionality and supports web browsing. These are merely illustrative examples.

An illustrative electronic device of the type that may be provided with a camera is shown in FIGS. 2A and 2B. Device 10 of FIGS. 2A and 2B may be, for example, a handheld electronic device that supports 2G and/or 3G cellular telephone and data functions, global positioning system capabilities, and local wireless communications capabilities (e.g., IEEE 802.11 and Bluetooth®) and that supports handheld computing device functions such as internet browsing, email and calendar functions, games, music player functionality, etc.

Device 10 may have housing 1012. Housing 1012, which is sometimes referred to as a case, may be formed of any suitable materials including plastic, glass, ceramics, metal, or other suitable materials, or a combination of these materials. In some situations, housing 1012 or portions of housing 1012 may be formed from a dielectric or other low-conductivity material. Housing 1012 or portions of housing 1012 may also be formed from conductive materials such as metal.

With one suitable arrangement, which is sometimes described herein as an example, the sidewalls of housing 1012 are formed from a material such as plastic or metal (e.g., a metal bezel or metal band that surrounds substantially the entire periphery of device 10), whereas the front and rear surfaces of device 10 are formed from planar glass structures. The glass structure on the front surface of device 10 may be, for example, a planar cover glass layer or other glass structure associated with a display such as a touch screen display. The front surface glass may cover some or substantially all of the front of device 10. The glass structure on the rear surface of device 10 may be, for example, a planar cosmetic glass layer, a glass layer through which visible indicators such as status light-emitting-diodes or back-lit icons are displayed, a layer of touch screen glass that forms part of a rear-mounted touch screen, other display structures, etc. The glass structure on the rear of device 10 may cover some or substantially all of the planar rear surface of device 10.

Figure 13:
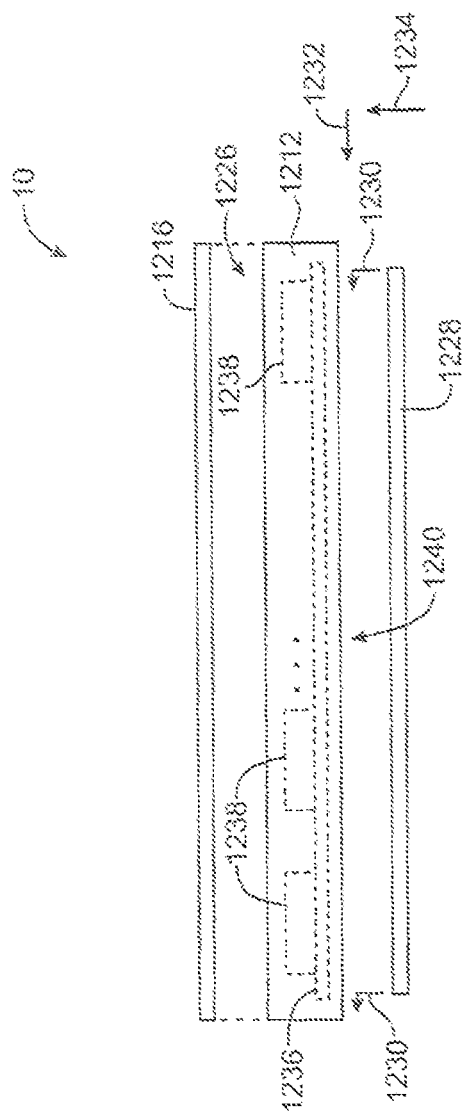
FIG. 13 is a cross-sectional side view of an electronic device that may be provided with a camera in accordance with an embodiment of the present invention.

An illustrative configuration in which a display such as display 1014 is mounted on the front surface of device 10 is shown in FIG. 13. Display 1014 may be a liquid crystal display (LCD), an organic light emitting diode (OLED) display, an electronic ink display, a plasma display, or any other suitable display. The outermost surface of display 1014 may be formed from a layer of glass (sometimes referred to as the display's cover glass). Display 1014 may also have interior layers (e.g., a capacitive touch sensor array for providing display 1014 with touch sensing capabilities, a layer of thin-film transistors for controlling the image pixels in the display, etc.).

Display 1014 may have a central active region such as active region 1217 and inactive end regions such as regions 1221. To hide interior portions of device 10 from view, the underside of display 1014 (e.g., the cover glass of the display) in inactive regions 1221 may be coated with an opaque substance such as black ink (as an example). The inner surface of the rear surface glass layer may also be covered with an opaque substance such as black ink.

An opening may be formed in one of regions 1221 of the display cover glass to accommodate button 1016. An opening such as opening 1223 may also be formed in one of regions 1221 (e.g., to form a speaker port). The end portions of housing 1012A (i.e., the peripheral metal band or other housing sidewall structures) may also be provided with openings such as openings 1222 and 1224 for microphone and speaker ports and opening 1220 for an input-output data port.

Device 10 may be used to capture image data such as still images and video clips. For example, a front-facing camera 26 may be placed under one of regions 1221. A rear-facing camera 28 may be placed under the glass or other structures on the rear surface of device 10. A camera flash such as camera flash 30 may also be provided. Camera window openings may be formed in the opaque ink layers that are printed on the interior surfaces of the front and rear glass layers to allow the camera to receive images through the glass. Openings in plastic or metal housing structures may also serve as camera windows.

Cameras may be used to capture images and video and are sometimes referred to as camera modules. A typical camera module includes an imaging chip, an optional image processing chip, a lens, and associated packaging structures. If desired, device 10 may only have a single camera (e.g., only a front-facing camera 26 or only a rear-facing camera 28). Device 10 may also have two or more cameras (e.g., both front-facing camera 26 and rear-facing camera 28). Device 10 may be provided with a camera flash or light such as camera flash 30.

An exploded cross-sectional side view of an illustrative configuration that may be used for device 10 of FIGS. 2A and 2B is shown in FIG. 13. As shown in FIG. 13, device 10 may have a band-shaped peripheral housing sidewall portion 1212. Band 1212 may, for example, be a rectangular ring formed from a material such as plastic or metal. Mounting structures such as printed circuit board 1236 may be mounted within device 10. Components 1238 may be mounted on printed circuit board 1236. Components such as components 1238 may include integrated circuits, discrete components, switches, data port connectors, batteries, antennas, displays, microphones, speakers, etc. Front member 1216 may be attached to front side 1226 of device 10. Rear member 1228 may be attached to rear side 1240 of device 10. Front member 1216 and rear member 1228 may be formed from plastic, metal, glass, ceramics, composites, other suitable materials, or combinations of these materials.

With one suitable arrangement, which is sometimes described herein as an example, front member 1216 may be formed from one or more layers of glass. For example, front member 1216 may include a touch screen display with a layer of cover glass that is mounted to housing portion 1212. Rear member 1228 may also be formed from one or more layers of glass. For example, rear member 1228 may be formed from a rectangular layer of glass that fits within a recess in housing portion 1212. When attached to housing 1212, members 1216 and 1228 may be considered to form part of housing 1212.

Members 1216 and 1228 may be attached to housing 1212 using adhesive, screws, clips, other fasteners, etc. During assembly, it may be desirable to use a sliding motion when attaching rear member 1228. For example, it may be desirable to move rear member along path 1230. Initially, member 1228 may be moved in direction 1234. After moving member 1228 in direction 1234, member 1228 may be slid along direction 1232. This type of compound pressing and sliding motion may be used to attach member 1228 to device 10 or other suitable attachment techniques may be used to attach member 1228.

Figure 14:
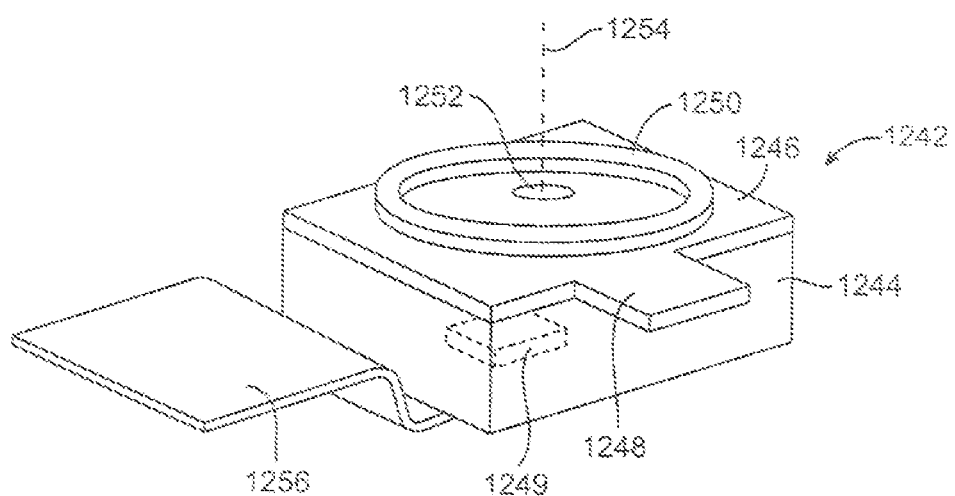
FIG. 14 is a perspective view of an illustrative camera module that may be used in an electronic device in accordance with an embodiment of the present invention.

FIG. 14 is a perspective view of an illustrative camera module of the type that may be included in device 10 to provide device 10 with imaging capabilities. As shown in FIG. 14, camera module 1242 may include a base such as cube-shaped base 1244. Base 1244 may be formed from materials such as plastic and may be used to house electronic components 1249 for camera module 1242 such as an imaging array and processing circuitry. Lens 1252 may be used to gather images for camera module 1242. Light may be received along axis 1254.

Trim member 1246 may be formed from part of base 1244 or may be attached to base 1244 (e.g., using adhesive or other fastening mechanisms). Portion 1248 of member 1246 may form a protrusion (e.g., as part of a camera flash unit or other camera structure, as a trim extension, etc.). Electrical connection to the circuitry in camera module 1242 may be made using flexible printed circuit 1256. Flexible printed circuit 1256 ("flex circuit") may include conductive traces that are electrically connected to imaging circuitry 1249 of camera module 1242.

The shape and size of camera module 1242 of FIG. 14 is merely illustrative. Module 1242 may, for example, have a cylindrical shape or other suitable shape.

When mounted within the housing of device 1212, the front (upper) surface of camera module 1242 may press against a camera window structure. A gasket such as ring-shaped gasket 1250 may be used to form a seal with the housing or other structures in device 10 against which camera module 1242 is mounted. The seal may help to prevent intrusion of dust or other contaminants in the vicinity of lens 1252. Gasket 1250 may be formed from foam, foam coated with a slippery material such as polytetrafluoroethylene, elastomeric materials such as synthetic or natural rubber, silicone, mixtures of foam and polymers, or other suitable flexible materials. The camera window may be formed from a clear plastic or glass member or may be formed from an opening in member 1228 or 1216. Members such as members 1228 and 1216 may, for example, include planar glass layers that are coated with a layer of an opaque substance such as black ink. A camera window may be formed from a circular opening in the black ink. This type of opening may be formed on the front side of device 10 (e.g., an opening in inactive region 1221 of FIG. 13) or on the rear of device 10 (e.g., a camera window opening in the ink on rear glass layer 1228).

As described in connection with FIG. 13, rear glass member 1228 may be mounted on device 10 using a push-and-slide motion involving movement along vertical direction 1234 followed by movement along horizontal dimension 1232. When camera module 1242 is mounted behind rear glass member 1228, gasket 1250 may form a seal with rear glass member 1228. Gasket 1250 may be formed from a slippery material or may have a surface coating of a slippery material to ensure that gasket 1250 does not catch and tear as rear member 1228 is translated across the surface of gasket 1250 in direction 1232 (FIG. 13).

To ensure proper translational alignment (horizontal and vertical lateral alignment) and proper rotational alignment between the opening in the ink of layer 1228 (or other suitable camera window structure) and lens 1252, device 10 may be provided with alignment structures. These alignment structures may be implemented using guiding grooves, rails, hooks, sidewalls, or other features that serve to align camera module 1242 when camera module 1242 is mounted in device 10. Alignment structures may be formed from plastic, glass, ceramic, metal, composites, other suitable materials, or combinations of these materials. Alignment structures may be attached to housing 1212 or formed as integral portions of housing 1212. For example, alignment structures may be formed from part of a peripheral sidewall band, as part of front member 1216, as part of rear member 1228, as part of a rail or frame that is attached to a peripheral sidewall band or front or rear housing member, etc.

Alignment structures may, for example, be attached to rear housing member 1228. As rear housing member 1228 slides in direction 1232 (FIG. 13), camera module 1242 may slide into engagement with the alignment structures.

Figure 15:
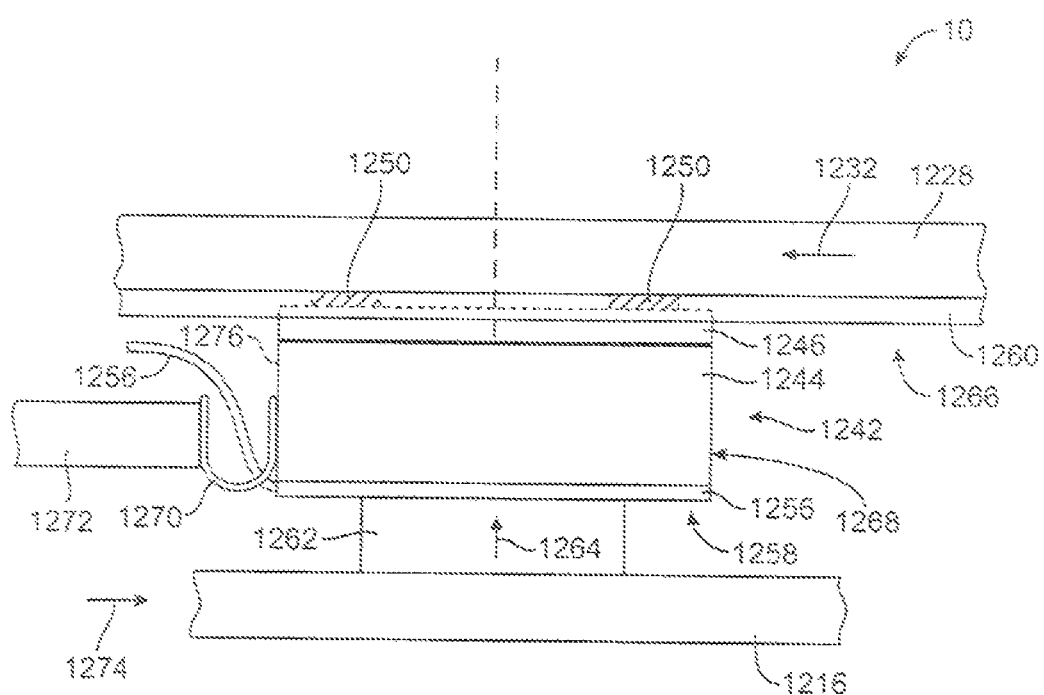
FIG. 15 is a cross-sectional side view of an illustrative camera module in an interior portion of an electronic device in accordance with an embodiment of the present invention.

As shown in FIG. 15, camera module 1242 may be mounted so that rear surface 1258 rests on biasing structures 1262. Biasing structures 1262 may be supported by part of display 1216 or housing 1212 (as examples). Biasing structures 1262 may be formed from springs or other suitable biasing elements. For example, biasing structures 1262 may be formed from one or more pieces of foam or other elastomeric members. When compressed, biasing structures 1262 bias camera module 1242 upwards in vertical direction 1264. This helps hold camera module 1242 against inner surface 1266 of rear member 1228.

Alignment structures 1260 may be mounted to inner surface 1266. Grooves or other features in structures 1260 may guide trim 1246 of camera module 1242 into place as rear member 1228 slides in direction 1232 during assembly. A portion of member 1228 and/or a portion of alignment structures 1260 may bear against camera module sidewall 1268 as member 1228 slides in direction 1232. At the same time, bias structures 1270 (e.g., springs, foam, or other biasing members) may be compressed between structure 1272 and camera module sidewall 1276. This generates a restoring force on camera module 1242 in direction 1274. Structure 1272 may be a printed circuit board, a frame member or other internal housing structure, or other suitable portion of device 10.

Figure 16:
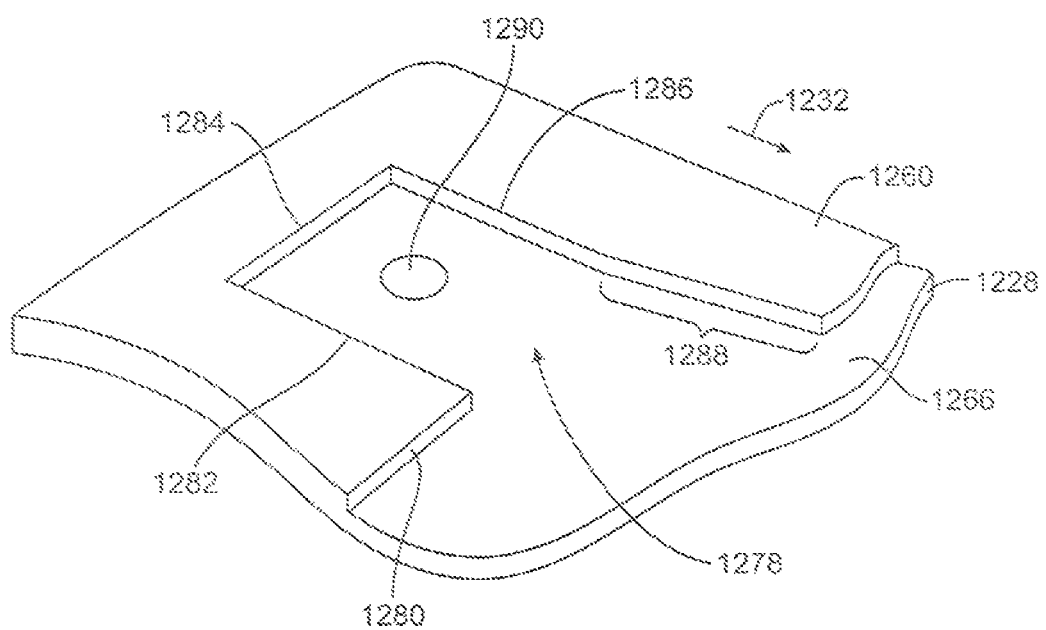
FIG. 16 is a perspective view of a portion of a planar electronic device member such as a glass panel that has been provided with a camera module alignment structure in accordance with an embodiment of the present invention.
Figure 17:
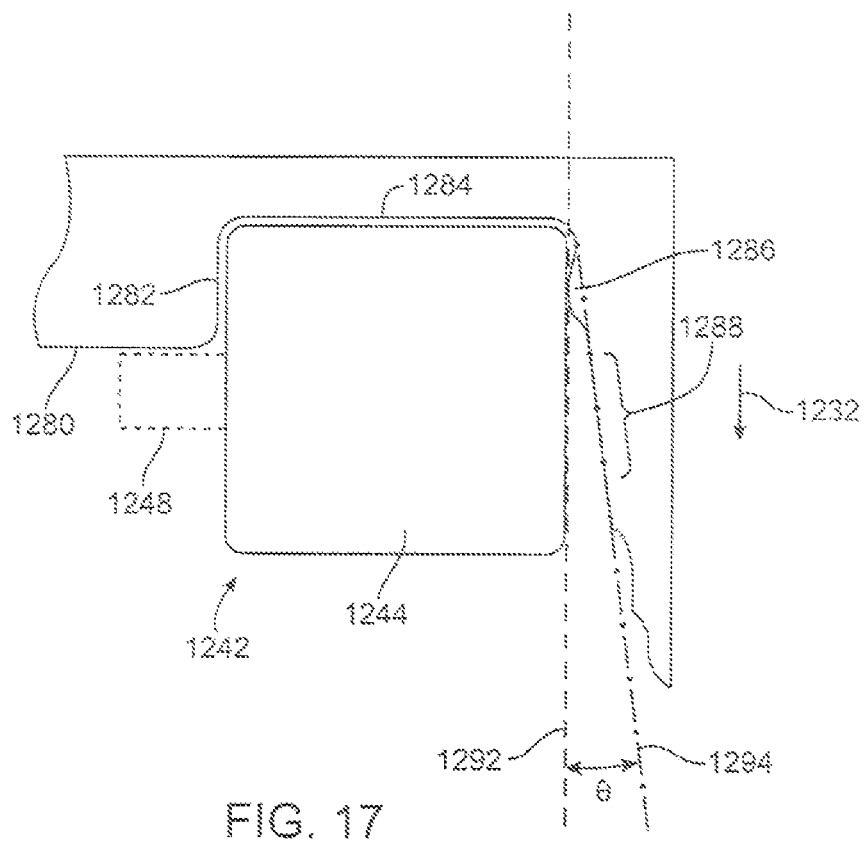
FIG. 17 is a top view of a camera module alignment structure of the type shown in FIG. 16 and an associated camera module in an electronic device in accordance with an embodiment of the present invention.

To complete assembly, rear member 1228 may be slid further in direction 1232. FIG. 16 is a perspective view of inner surface 1266 of rear member 1228. As shown in FIG. 16, alignment structure 1260 may be a thin plastic plate or other structure that is mounted to the inner surface 1266 (e.g., with adhesive). Alignment structure 1260 may have an alignment groove with alignment walls 1280, 1282, 1284, and 1286. Walls 1282 and 1286 may be substantially parallel and may guide opposing edges of trim member 1246. Rear wall 1284 may serve as a stop that bears against surface 1268 of camera module 1242 (e.g., on trim 1246). Portion 1288 of sidewall 1286 may be flared outwards to form a guiding ramp that helps receive camera module 1242 within walls 1282, 1284, and 1286. For example, as shown in FIG. 17, portion 1288 may lie along an axis (axis 1294) that is oriented at an angle θ of about 0-30° with respect to axis 1292 of wall 1286. As member 1228 and structure 1260 move in direction 1232, camera module 1242 (i.e., trim 1246) is guided into alignment with walls 1282, 1284, and 1286. This ensures that lens 1252 (FIG. 14) of camera module 1242 is aligned with camera window opening 1290 (FIG. 16) in the ink layer on surface 1266.

Figure 18:
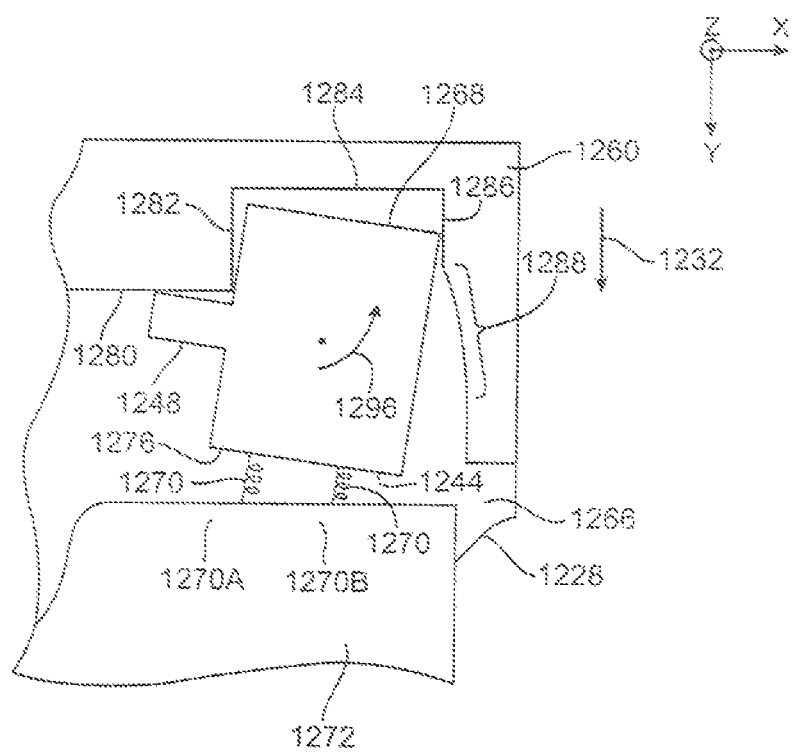
FIG. 18 is a top view of a camera module and associated electronic device structures showing how the camera module may be rotated into alignment by alignment structures during assembly in accordance with an embodiment of the present invention.

As shown by the dashed line in FIG. 17, camera module 1242 may have an optional protrusion that bears against wall 1280 of alignment groove 1278. Protrusion 1248 may be part of a flash unit for camera module 1242 or other protruding structure. As shown in FIG. 18, as member 1228 is moved in direction 1232, wall 1280 bears against protrusion 1248 while biasing structures 1270 (e.g., springs) press against surface 1276, rotating camera module in counterclockwise direction 1296 (in the orientation of FIG. 18). This forces surface 1268 to come to rest parallel to wall 1284, thereby helping to ensure that camera module 1242 is rotationally aligned with electronic device 10 (i.e., the camera is not tilted). Sidewall 1284 helps ensure that camera module 1242 is mounted at a fixed location in dimension Y. Sidewalls 1282 and 1286 help ensure that camera module 1242 is mounted at a fixed location in dimension X. The portion of surface 1266 against which module 1242 is biased helps ensure that camera module 1242 is mounted at a fixed location in dimension Z.

The use of alignment structures such as structures 1260 of FIGS. 15, 16, 17, and 18 to rotationally and laterally align camera module 1242 relative to electronic device 10 is merely illustrative. Any suitable alignment structures may be used to align and mount camera module 1242 in device 10. For example, camera module 1242 can be aligned and mounted within device 10 by providing hook-shaped engagement features on member 1228 and mating protrusions on camera module 1242. This type of arrangement is shown in FIG. 19.

Figure 19:
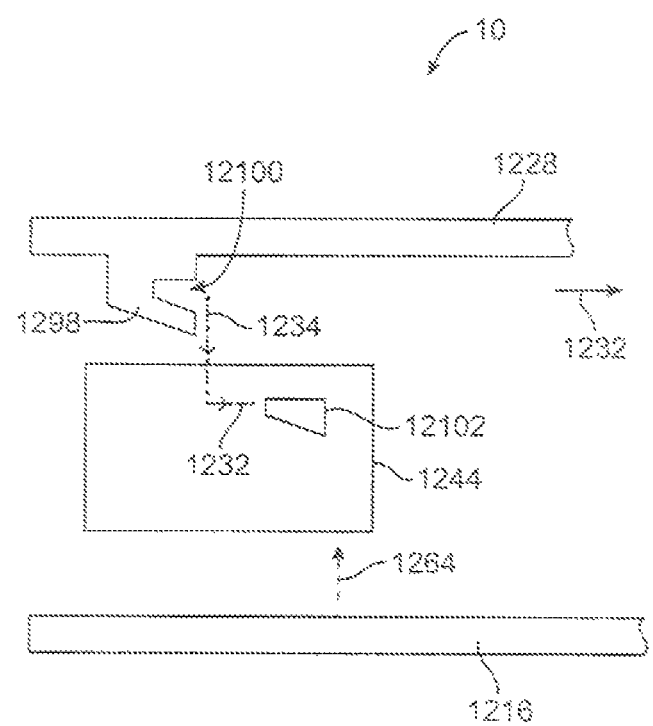
FIG. 19 is an exploded cross-sectional view showing how an electronic device may have housing portions that have engagement features that engage with mating engagement features on a camera module for aligning and mounting the camera module within the electronic device in accordance with an embodiment of the present invention.

As shown in FIG. 19, hook-shaped structures 1298 may include openings such as opening 12100 that mate with protrusions 12102 on camera module 1242. Structures 1298 may be formed as an integral portion of rear member 1228 or may be attached to member 1228 (e.g., using adhesive, fasteners, etc.). Protrusions 12102 may be formed as part of trim 1246, as part of plastic base 1244, or other portions of camera module 1242 or may be formed from structures that are attached to camera module 1242.

During assembly, member 1228 may be moved in vertical direction 1234. Structures 1298 may be provided with bevels or other guide features that help ensure that structures 1298 will ride over the outer edges of camera module 1242. After structures 1298 have been placed over camera module 1242, member 1228 may be moved horizontally in direction 1232 (i.e., parallel to the longitudinal axis of electronic device 10). Once moved sufficiently, protrusions 12102 will enter and mate with openings 12100 in hook structures 1298.

Any suitable number of hook structures 1298 and protrusions 12102 may be used to mount camera module 1242. For example, there may be two hook structures 1298 and two corresponding protrusions 12102. One hook and protrusion may be located on the near side of camera module 1242 and one hook and protrusion may be located on the far side of camera module 1242 (in the orientation of FIG. 19).

Figure 20:
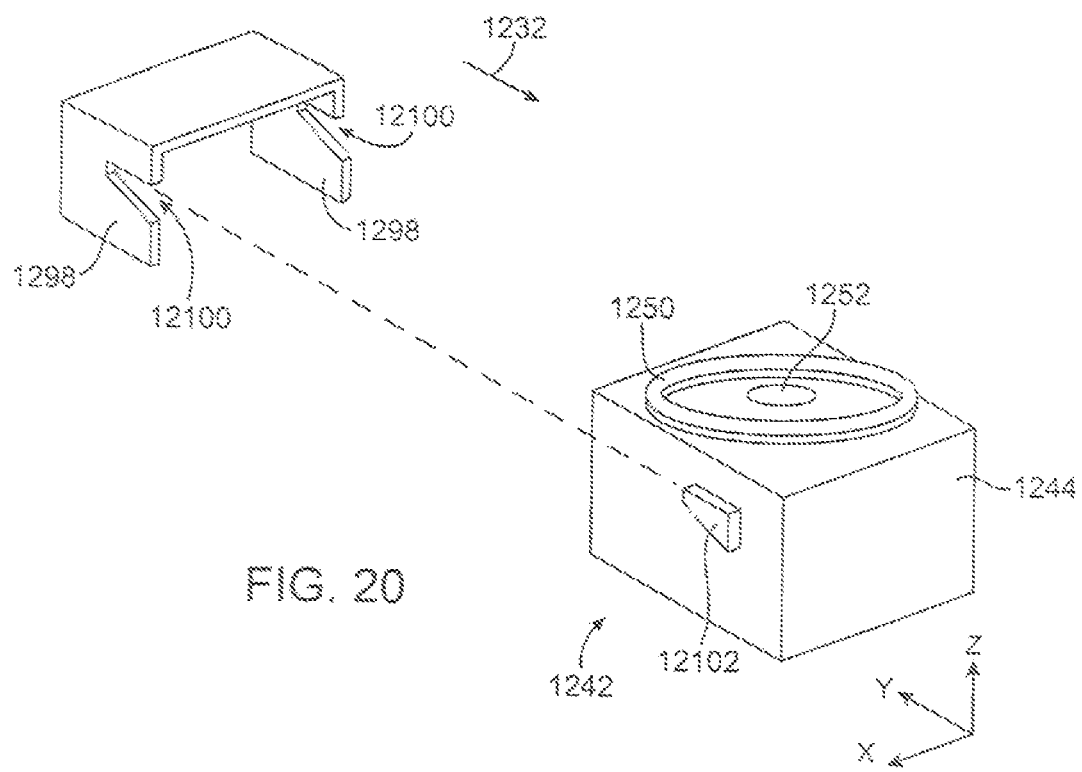
FIG. 20 is an exploded perspective view of a camera module and a housing structure with mating hook-shaped engagement features in accordance with an embodiment of the present invention.

FIG. 20 is a perspective view showing how openings 12100 in hook-shaped structures 1298 and protrusions 12102 may serve as mating engagement features when rear member 1228 and structures 1298 are moved in direction 1232 relative to camera module 1242 during assembly.

Figure 21:
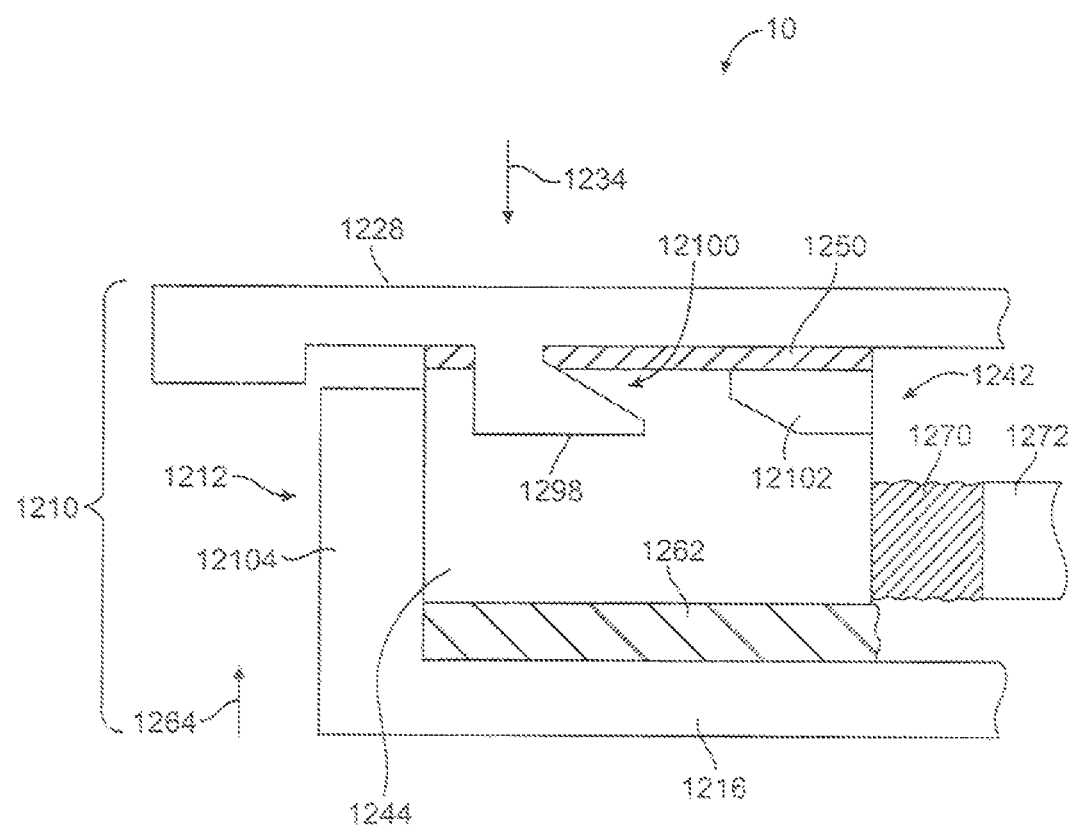
FIG. 21 is a cross-sectional side view of an electronic device in a partially assembled state showing how housing structures may be provided with hook-shaped engagement features that mate with corresponding prong-shaped engagement features on a camera module in accordance with an embodiment of the present invention.
Figure 22:
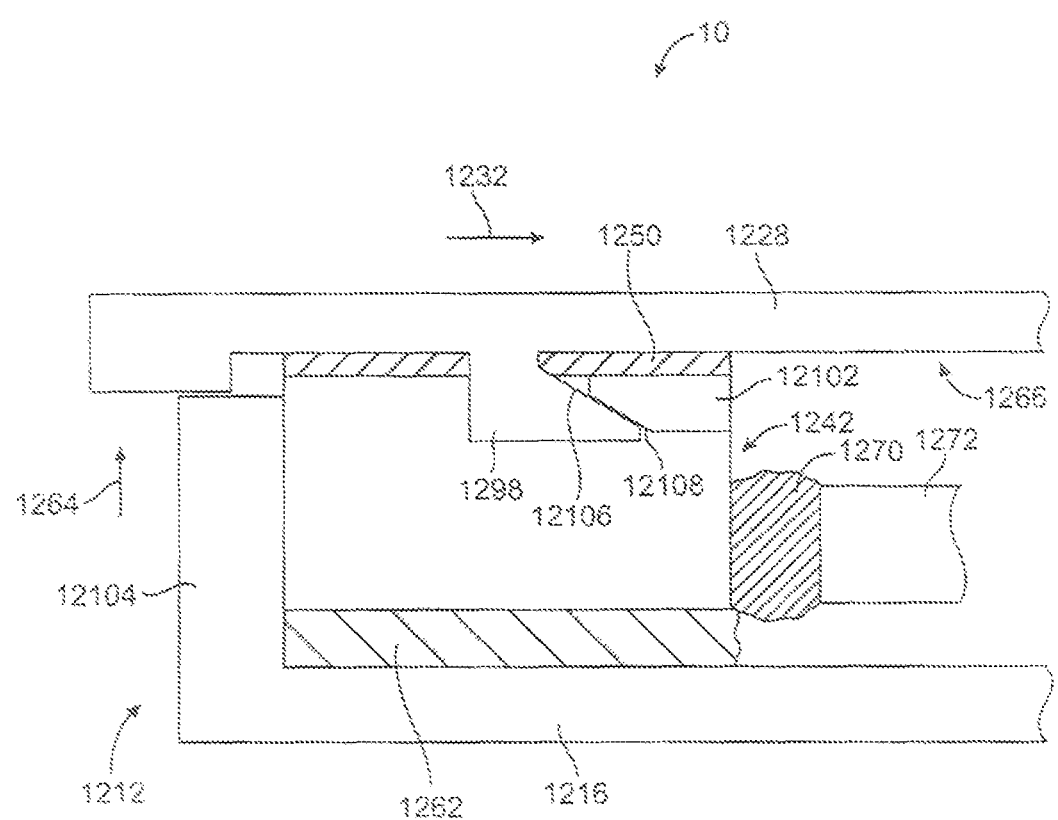
FIG. 22 is a cross-sectional side view of the electronic device of FIG. 21 showing how the hook-shaped engagement features may be slid into place towards protruding engagement features on the camera module during device assembly in accordance with an embodiment of the present invention.
Figure 23:
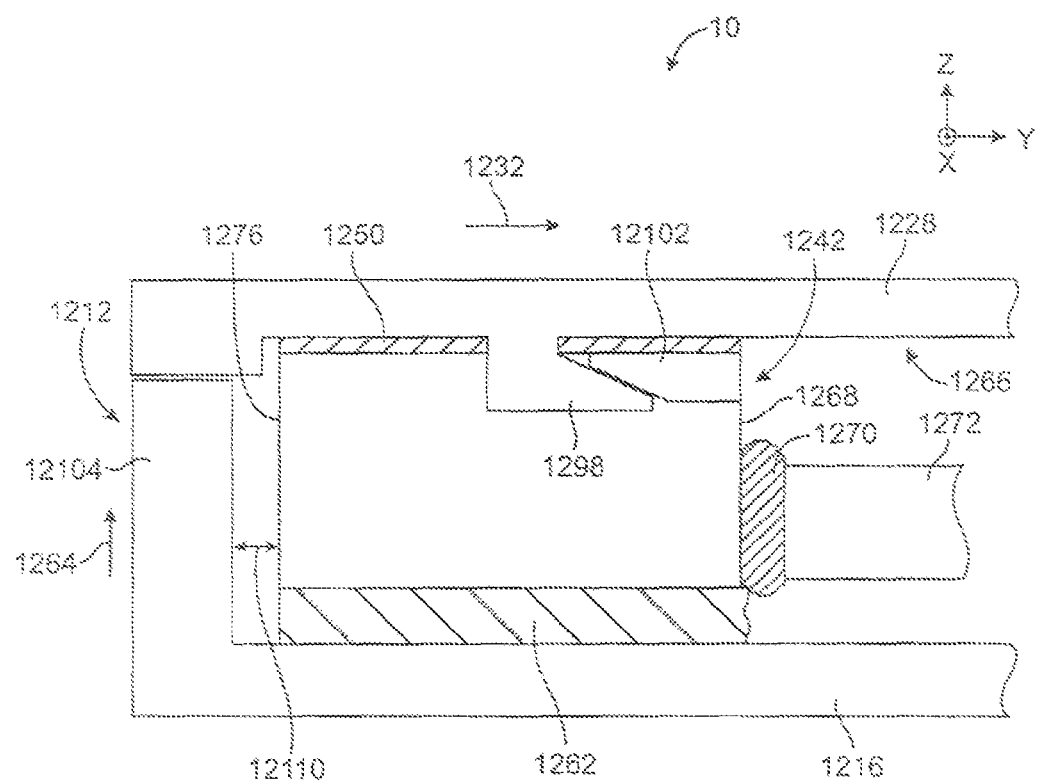
FIG. 23 is a cross-sectional side view of the electronic device of FIG. 22 showing the hook-shaped and prong-shaped engagement features of FIGS. 21 and 22 in a mated configuration in accordance with an embodiment of the present invention.

FIGS. 21, 22, and 23 illustrate how structures 98 may engage with structures 12102 during assembly.

Initially, camera module 1242 may be placed within housing 1212 on biasing structure 1262. Biasing structure 1270 may be compressed between structure 1272 (e.g., a housing structure or printed circuit board in device 10) and camera module 1242, thereby pushing camera module 1242 adjacent to rear wall 12104 of housing 1212. Biasing structure 1262 may be formed from foam or other structures that bias camera module 1242 in direction 1264 towards rear member 1228. Rear member 1228 may be placed on device 10 in direction 1234. As structures 1298 reach camera module 1242, a bevel on at least one of structures 1298 helps ensure that structures 1298 will not catch on the edges of camera module 1242.

After rear member 1228 has been placed on device 10 as shown in FIG. 21, rear member 1228 can be moved in direction 1232, as shown in FIG. 22. Each of hook-shaped structures 1298 may have an angled surface 12106 that is oriented at a non-zero angle with respect to the plane of rear surface member 1228. Each protrusion 12102 may have an angled surface 12108 that makes a non-zero angle with respect to the plane of rear surface member 1228. As member 1228 moves in direction 1232, each angled surface 12106 of structures 1298 bears against a corresponding one of the angled surfaces 12108 of protrusions 12102, biasing camera module 1242 in direction 1264 against inner surface 1266 of rear member 1228. This helps compress foam gasket 1250 between camera module 1242 and rear member 1228.

Continued movement of rear member 1228 in direction 1232 results in the configuration of FIG. 23 in which foam gasket 1250 is further compressed against inner surface 1266 of rear member 1228, gap 12110 has formed between rear housing portion 12104 and surface 1276 of camera module 1242, and biasing structure 1270 is compressed between surface 1268 of camera module 1242 and structure 1272. In this configuration, compressed biasing structure 62 biases camera module 1242 in direction 1264, but this biasing process is assisted by the engagement of structures 1298 and protrusions 12102. Because the alignment structures formed by structures 1298 and protrusions 12102 help compress gasket 1250 between camera module 1242 and rear member 1228, the tendency of biasing structure 1262 to push apart members 1228 and 1216 can be minimized.

In the FIG. 23 arrangement, a gap such as gap 12110 may be formed between housing wall 12104 (e.g., a peripheral band structure in housing 1212) and surface 1276 of camera module 1242. The location of camera module 1242 in this state is known. Because structures 1298 are rotationally aligned with respect to member 1228, rotational alignment of camera module 1242 is achieved when structures 1298 engage with protrusions 12102 as shown in FIG. 23. Engagement between hook structures 1298 and protrusions 12102 also serves to fix the location of camera module 1242 in dimensions Y and X. Surface 1266 locates camera module 1242 in dimension Z.

Figure 24:
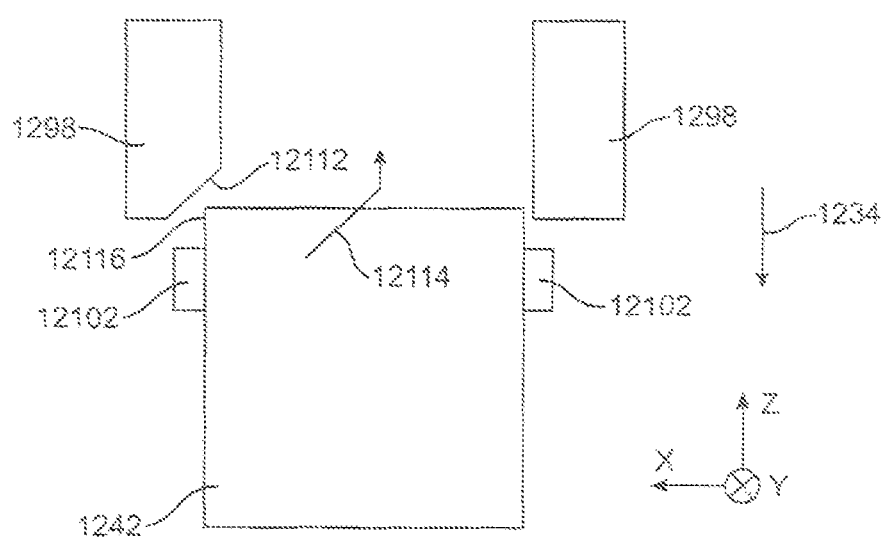
FIG. 24 is a cross-sectional end view of an electronic device showing how hook-shaped engagement features may be provided with beveled edges that form guiding surfaces to help ensure that a device housing fits over a camera module properly during device assembly operations in accordance with an embodiment of the present invention.

A cross-sectional end view of structures 1298 showing how one of structures 1298 may be provided with an angled surface such as bevel 12112 is shown in FIG. 24. As structures 1298 are moved in direction 1234 during the initial stages of assembly (i.e., before sliding member 1228 and structures 1298 into engagement with protrusions 12102), angled surface 12112 may bear against corner 12116 of camera module 1242. This causes camera module 1242 to follow path 12114 relative to structures 1298, ensuring alignment of camera module 1242 relative to structures 1298 in dimension X.

Figure 25:
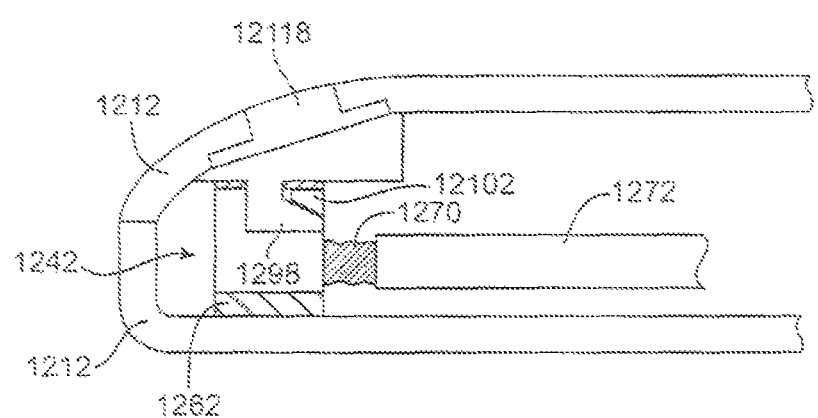
FIG. 25 is a cross-sectional side view of an illustrative electronic device in which mating hooks and prongs have been used to mount a camera module beneath a camera window in a rear housing wall in accordance with an embodiment of the present invention.

If desired, camera lens 1252 may be aligned with a camera window that is formed from a cylindrical opening in the sidewalls of housing 1212. An arrangement of this type is shown in FIG. 25. As shown in FIG. 25, device 10 may have a housing 1212 in which an opening such as camera window opening 12118 is formed. Opening 12118 may be formed by placing a clear plastic or glass window in an opening in housing 1212. A cylindrical metal liner, an elastomeric gasket, and other structures may, if desired, be used in forming camera window opening 12118. Camera module 1242 may have a lens (see, e.g., lens 1252 of FIG. 14) that is aligned with camera opening 12118. Rotational and lateral alignment between camera module 1242 and housing 1212 may be ensured by attaching hook structures 1298 to housing 1212 and by providing camera module 1242 with protrusions 12102 that mate with hook structures 1298.

Electronic device displays are often provided with cover glass layers that have an undercoating of black ink. Openings in the black ink may be formed for components such as cameras. Screen printing techniques are conventionally used to form these openings, which can lead to inaccurate placement of the openings and undesirably rough edges.

It would therefore be desirable to provide improved techniques for forming openings in opaque masking layers such as the layers of black ink that are formed on the underside of display cover glass layers.

In accordance with one embodiment, electronic devices (e.g., device 10 of FIG. 1) may be provided with cover glass layers or other transparent substrates that are coated with a patterned layer of opaque material such as black ink. The openings in this coating may be undersized relative to their desired final dimensions. Frame members and other components may be assembled to the cover glass. Following this assembly process, a laser tool may be used to trim the opening in the opaque material. Because the opening is trimmed after the frame members are attached to the cover glass, the opening may be accurately aligned with respect to the frame members. Laser trimming operations may also help to ensure the formation of smooth edges in the opening.

In accordance with an embodiment, a method of forming an opening in an opaque layer of material on a transparent substrate is provided that includes depositing the opaque layer of material on the transparent substrate with an opening of a first size, and laser trimming the opening to create an opening of a second size that is larger than the first size.

In accordance with another embodiment, a method is provided that also includes attaching structures to the transparent substrate before laser trimming the opening.

In accordance with another embodiment, a method is provided that wherein the transparent substrate includes a display cover glass and wherein depositing the opaque layer includes screen printing the opaque layer on the display cover glass.

In accordance with another embodiment, a method is provided that wherein the structures includes frame structures and wherein laser trimming the opening includes using a laser to remove material from edges of the opening in alignment with the frame structures.

In accordance with another embodiment, a method is provided that wherein laser trimming the opening includes laser trimming a circular inner edge of a camera window opening.

In accordance with these embodiments, the display in an electronic device such as device 10 of FIG. 1 may be provided with a layer of black ink or other suitable opaque material (e.g., paint, ink, etc.). The layer of black ink or other opaque material may, for example, be formed on the underside of a cover glass layer that is associated with the display. The cover glass layer, which may be formed from a planar layer of glass, plastic, or other suitable transparent members, may be used to protect sensitive internal display components from damage.

In active regions of the display (i.e., portions of the display that contain image pixels for the display), the cover glass is not covered with black ink. This allows a user to view the image pixels through the cover glass. There may be, for example, a rectangular opening in the center of the cover glass that is aligned with a corresponding rectangular array of image pixels in a liquid crystal display.

In inactive peripheral regions of the display, the black ink may be provided on the underside of the cover glass. This helps shield internal components in the electronic device from view by the user, thereby improving device aesthetics.

Some components that are covered by the black ink are structural in nature. For example, the black ink may cover screws or other mechanical fasteners. Other components use light. These components include light sensors such as infrared and visible photodiodes that are used to detect ambient light, photodiodes that serve as part of light-based proximity sensors, etc. These components may also include camera components such as a camera (i.e., a camera module with an image sensor), a camera flash (e.g., a light-emitting diode), etc.

To ensure proper operation of a component that uses light, an opening may be formed in the black ink layer. Conventionally, such openings are created during the process of silk-screen printing of the black ink onto the cover glass. When formed in this way, however, openings tend to have undesirably rough edges. There is also a potential for misalignment with this type of conventional approach. For example, if a frame is attached to a cover glass with a silk-screened black ink layer that has an opening, multiple alignment tolerances come into play (i.e., frame-to-glass and glass-to-opening). Each alignment tolerance that is involved adds a potential source of misalignment.

To increase alignment accuracy and improve edge smoothness, laser trimming operations may be performed. With this type of arrangement, a laser may be used to trim the edge of the opening in the black ink layer.

Initially, a black ink layer or other layer of opaque material may be deposited on the cover glass or other transparent substrate. This layer may contain an undersized opening that is suitable for subsequent laser trimming.

An illustrative approach for depositing a black ink layer of this type is shown in the cross-sectional side view of FIG. 26. As shown in FIG. 26, a layer of opaque material may be deposited on a transparent substrate such as substrate 16310. Substrate 16310 may be a planar cover glass member, a planar layer of plastic, or any other transparent material.

Opaque substance 16304 may be black ink, ink of a color different than black, black paint, paint of a different color, or any other suitable opaque substance. Opaque substance 16304 is preferably formed from a material that is able to form a masking layer that blocks visible light. The use of black ink to form the masking layer is sometimes described herein as an example.

Black ink may be deposited in a pattern on substrate 16310 using pad printing, ink-jet printing, screen printing, painting, spraying, dripping, or any other suitable technique. The use of screen printing ("silk screening") is sometimes described as an example. As shown in FIG. 26, a screen printing apparatus may include an ink-permeable structure such as screen 16308 that has a desired pattern of ink-impermeable structures such as ink-blocking structure 16306. Ink-blocking structure 16306 may have the size and shape of an undersized opening for a camera or other light-based electronic component in an electronic device. During screen printing operations, squeegee 16300 may be moved in direction 16302 to force ink 16304 through unblocked portions of screen 16308 and onto the surface of substrate 16310.

The screen printing operations of FIG. 26 form a patterned black masking layer such as ink layer 16312 of FIG. 27 on the surface (i.e., the inner or underside surface in a finished device) of substrate 16310. Black ink layer 16310 includes one or more openings such as opening 16314. Structure 16306 is preferably sized so that opening 16314 has lateral dimensions (e.g., diameter D) that are less than the desired final dimensions of the finished opening (e.g., diameter DH). This leaves room for laser trimming of the interior periphery of opening 16314.

Laser trimming may be performed using laser trimming equipment 16332 of the type shown in FIG. 28. As shown in FIG. 3B, trimming equipment 16332 may include a laser such as laser 16328 that focuses a beam of light such as laser beam 16330 on ink layer 16312, thereby removing excess ink and forming a smooth edge (edge 16316) for opening 16314. The laser trimming process also helps align opening 16314 with respect to substrate 16310. Alignment with respect to structures such as frame structures 16318 that are attached to substrate 16310 can also be improved.

Laser 16328 may be a continuous wave (CW) or pulsed laser that operates in the visible, ultraviolet, or infrared portion of the light spectrum.

The position of laser 16328 and beam 16330 may be controlled using positioning stage 16326. Control unit 16324 may be used to control positioning stage 16326 based on information gathered from external sensors such as cameras 16322.

Structures 16318 may be housing structures, internal supports, display structures, a cover glass bezel structure, or other suitable structures. Structures 16318 may be attached to substrate 16310 using screws or other fasteners, adhesive, welds, solder, or other suitable attachment mechanisms (shown schematically as attachment points 16320). Once structures 16318 are attached to substrate 16310, opening 16314 may be trimmed using laser 16328. By trimming opening 16314 after structures 16318 have been attached to substrate 16310, opening 16316 can be trimmed with laser 16328 so as to improve its alignment accuracy with respect to structures 16318.

Control unit 16324 may include a computer or other suitable computing equipment that gathers and processes images from cameras 16322. These images may include images that provide information on the position of opening 16314, structures 16318, and substrate 16310. By processing this information, control unit 16324 may issue commands to positioning stage 16326 to ensure that laser 16328 is positioned properly during trimming. The resulting opening 16314 will have edges 16316 that are well aligned with respect to structures 16318. Camera structures, light-based sensors, and other light-based components may be directly attached to structures 16318 or may be connected to structures that are aligned with structures 16318, so improving the alignment of opening 16314 with respect to structures 16318 may help improve the alignment of opening 16314 with respect to these light-based components (i.e., to improve camera-to-opening alignment).

The laser trimming process may be used to improve the quality of edges 16316. FIG. 29 is a top view of opening 16314 before laser trimming, showing how edge 16316 in the ink layer is relatively rough due to screen printing artifacts. These irregular edges may be removed during the trimming process to produce smooth edges such as smooth edges 16316 of opening 16314 in FIG. 30. Opening 16314 may be a sensor opening, a circular camera window opening, or any other suitable opening.

If desired, other types of black ink edge may be trimmed using laser trimming (e.g., the edge of a rectangular opening, the edge of a strip of black ink, the edge of an opening or boundary with different shapes, etc.). The use of laser trimming to round and align the inner edges of a circular black ink opening is merely illustrative.

An electronic device such as an electronic device (see, e.g., FIGS. 1, 2A, and 2B) with planar transparent structures such as cover glass layers and glass housing surfaces may include a camera flash unit and a camera module. The camera module may include an image sensor for acquiring digital images. The flash unit may produce illumination to illuminate subjects during the acquisition of the digital images.

The flash unit may be formed from a light-emitting diode or other light source. A flash lens such as a Fresnel lens may be used to concentrate light that is emitted from the flash unit. The camera module may receive light through a camera window.

The flash unit and the camera module may be mounted adjacent to the planar transparent structure. For example, if the planar transparent structure is formed from a front-side display cover layer (e.g., a layer of cover glass, a protective plastic layer for a display, a protective layer of transparent ceramic for a display, etc.), the flash unit and the camera module may be mounted within the electronic device so that light from the flash is emitted through the cover layer and so that image light for the camera module is received through a camera window in the cover layer. As another example, if the planar transparent structure is formed from a rear-surface transparent layer such as a layer of glass on the back of an electronic device housing, the flash unit may emit light through the rear-surface transparent layer and the camera module can receive light through a camera window in the rear-surface transparent layer.

The planar transparent member (i.e., the cover glass layer or rear-surface planar transparent member) may be coated with an opaque substance such as a layer of black ink. For example, black ink may be used to cover substantially all of the inner surface of the planar transparent layer on the rear of a device housing or may be used to cover all non-active regions of a display cover layer.

A flash window may be formed by creating an opening in the black ink that receives the flash lens. During illumination with the flash unit, stray light may be internally reflected within the planar transparent structure. To avoid interference with the incoming image light, the camera window may be surrounded with an opaque light-blocking structure such as a camera window sleeve. The camera window sleeve may prevent light that has been launched into the planar transparent structure by the flash unit from being received by the camera module.

Figure 31:
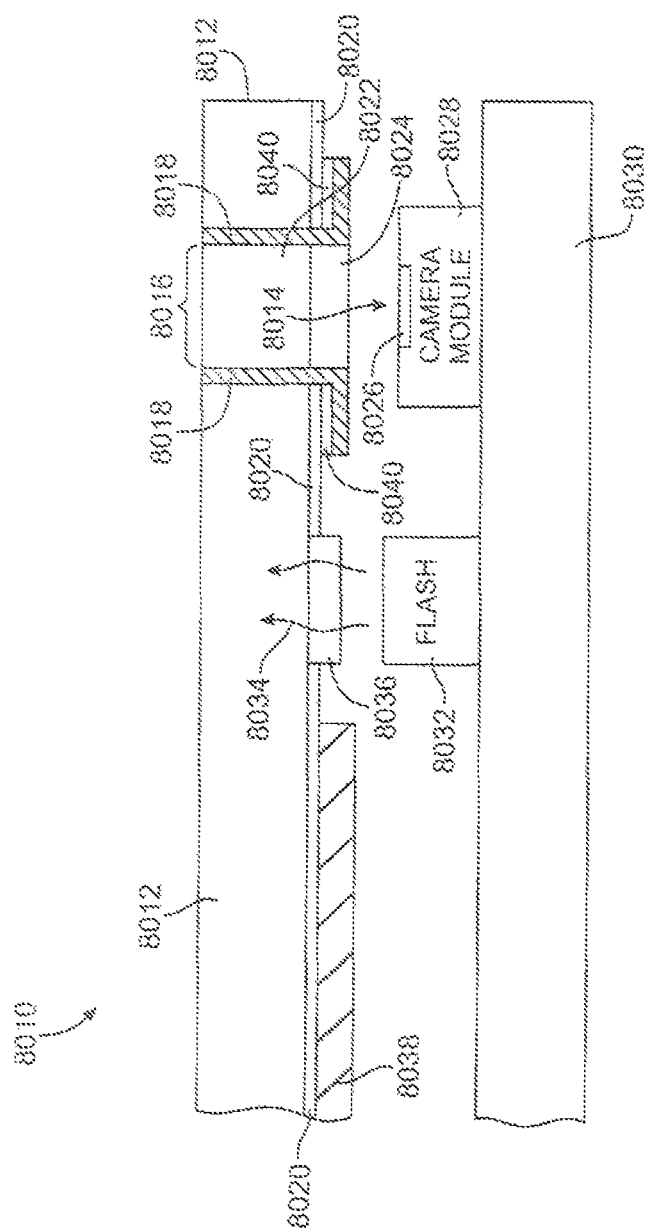
FIG. 31 is cross-sectional side view of a portion of an electronic device that has a flash window and a camera window in accordance with an embodiment of the present invention.

An illustrative electronic device of the type that may be provided with a camera window sleeve is shown in FIG. 31. As shown in FIG. 31, electronic device 8010 may include planar transparent structure 8012 and planar structure 8030. Structure 8012 may be formed on the front of device 8010 and structure 8030 may be formed on the rear of device 8010 or vice versa. Device 8010 may be a cellular telephone, a media player, a tablet computer, a laptop computer, or other electronic equipment.

In arrangements in which structure 8012 is formed on the front surface of device 8010, layer 8012 may be a protective display cover layer. This layer may be formed from glass (i.e., cover glass), ceramic, plastic, or other materials. Structure 8030 may be part of a rear housing structure for device 8010 (e.g., a planar transparent member that forms a rear housing surface, an opaque housing structure, internal supports, etc.).

In arrangement in which structure 8010 is formed on the rear surface of device 8010, layer 8012 may be a planar member such as a layer of glass that forms a rear housing surface structure for device 8010, a layer of transparent plastic, a layer of transparent ceramic, etc. Layer 8030 may be a layer of cover glass or other display structures, housing structures, internal housing elements, etc.

As shown in FIG. 31, transparent layer 8012 may have an internal coating such as coating 8020. Coating 8020 may be an opaque coating layer such as a layer of black ink. One or more additional layers of material (shown as structures 8038 in FIG. 31) may be attached to layer 8012 if desired. Structures 8038 may include, for example, a sheet of metal, composite layers, layers of plastic, adhesive layers, etc. Structures 8038 may enhance the strength of layer 8012 and may prevent layer 8012 from breaking into individual pieces in the event that device 8010 is dropped.

Flash unit 8032 may be based on one or more light-emitting diodes (e.g., white light-emitting diodes) or any other light source. During flash discharge events (or continuous illumination), flash unit 8032 produces light 8034. Light 8034 may be used to illuminate a subject (e.g., a person who is being photographed by the user of device 8010). A flash lens such as lens 8036 may be formed within an opening (flash window opening) in black ink layer 8020. Lens 8036 may be, for example, a Fresnel lens that is formed from a pattern of ridges impressed in ultraviolet-light-cured epoxy. Lens 8036 may be cut from a sheet of lenses and glued onto the inner surface of planar transparent structure 8012 with optically clear adhesive. Lens 8036 may be used to help concentrate light 8034 in the direction of the subject that is being illuminated.

Because layer 8012 is transparent, light 8034 may be reflected within layer 8012. To prevent camera module 8028 from receiving stray rays of light 8034, camera window 8016 may be provided with an opaque light-blocking structure such as camera window sleeve 8018. Sleeve 8018 may be formed from an opaque substance such as stainless steel, other metals, plastic, etc. A transparent camera window element such as camera window element 8022 may be mounted within sleeve 8018. Window element 8022 may be formed from a disk of transparent material such as glass, plastic, or ceramic (as examples).

Alternating high-index-of-refraction and low-index-of-refraction layers may be used to form an infrared light-blocking filter such as infrared filter 8024 on the interior surface of window element 8022. Camera module 8028 may have a lens such as lens 8026. During operation of camera module 8028, image light 8014 is received through window 8016 (i.e., through transparent element 8022 and associated infrared filter layers 8024) and enters camera module 8028 via lens 8026.

Camera sleeve 8018 may be attached to planar transparent structure 8012 using adhesive, fasteners, engagement structures, etc. In the example of FIG. 31, sleeve 8018 has been attached to structure 8012 using a layer of adhesive (layer 8040) that is interposed between camera sleeve 8018 and ink layer 8020.

Figure 32:
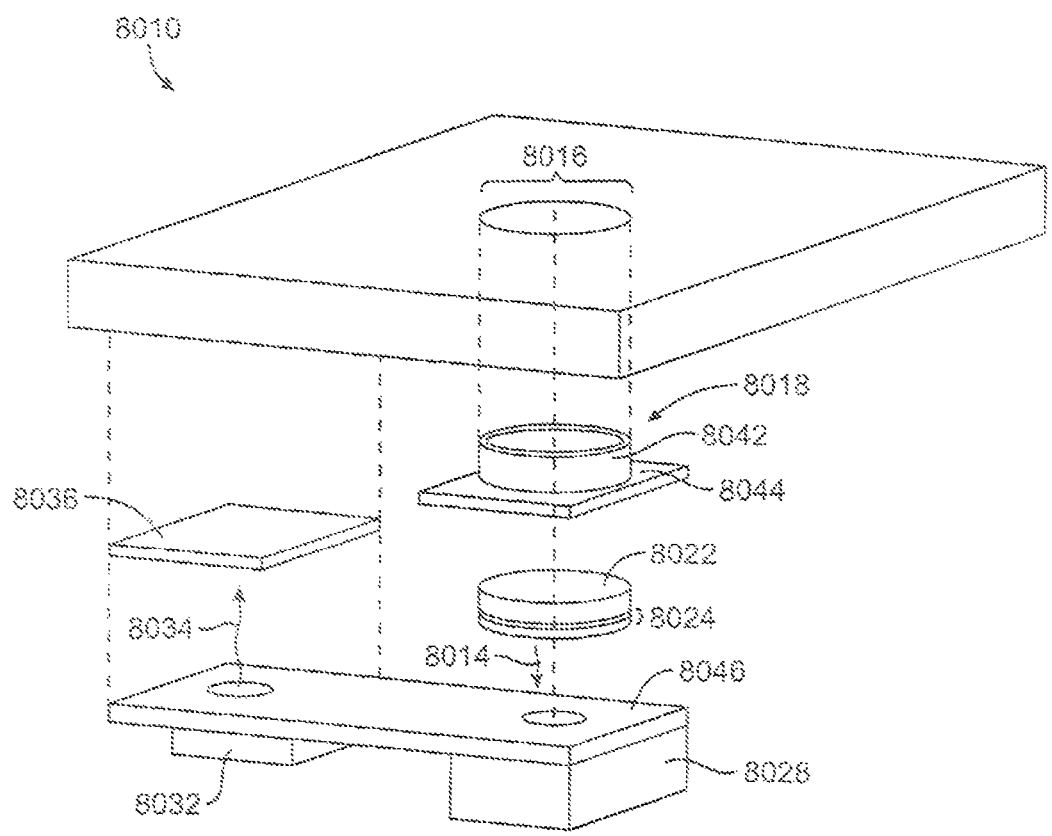
FIG. 32 is an exploded perspective view of electronic device structures associated with a camera window of the type shown in FIG. 31 in accordance with an embodiment of the present invention.

FIG. 32 is an exploded perspective view of device 8010 showing how camera module 8028 and flash unit 8032 may be mounted to a support structure such as structure 8046. Structure 8046 may include layers of plastic, metal, ceramics, composites, etc. For example, structure 8046 may include a metal heat sink structure.

FIG. 32 shows how camera sleeve 8088, which may sometimes be referred to as a camera trim or camera window trim, may have a planar base member such as member 8044. Member 8044 may have a hole such a circular hole. Camera sleeve 8088 may also have a cylindrical tube member 8042 that mates with the hole in member 8044. Cylindrical tube member 8042 and base member 8044 may be formed form a single piece of material (e.g., a unitary machined metal part) or may be formed by welding or otherwise connecting cylindrical tube member 8042 to base member 8044.

In accordance with an embodiment, electronic device structures are provided that include: a planar transparent member, an opening in the planar transparent member that forms a camera window, an opaque camera window sleeve in the opening, and a transparent camera window element in the sleeve.

In accordance with another embodiment, electronic device structures are provided wherein the planar transparent member includes a glass housing surface member that is coated with an opaque material and wherein the opaque material has an opening that forms a flash window in the planar transparent member.

In accordance with another embodiment, electronic device structures are provided that also include a flash unit that emits light through the flash window, wherein the opaque camera window sleeve blocks the light from the flash unit.

In accordance with another embodiment, electronic device structures are provided that also include a camera module that receives image light through the transparent camera window element.

In accordance with another embodiment, electronic device structures are provided that also include an infrared-light-blocking filter layer on the transparent camera window element.

In accordance with another embodiment, electronic device structures are provided wherein the opaque camera window sleeve comprises metal, wherein the opaque camera window sleeve has a cylindrical tube portion, and wherein the opaque camera window sleeve has a planar base portion that is mounted to an inner surface of the glass housing surface member using adhesive.

The foregoing is merely illustrative of the principles of this invention and various modifications can be made by those skilled in the art without departing from the scope and spirit of the invention.

What is claimed is:

1. Apparatus, comprising:
   an electronic device housing structure having a camera window;
   an alignment structure mounted to the housing structure, wherein the alignment structure comprises a ring-shaped member having an opening that is aligned with the camera window, wherein the alignment structure further comprises at least two protrusions that extend from the ring-shaped member and that define a notch between the protrusions, wherein the alignment structure is oriented such that the ring-shaped member is between the protrusions and the camera window; and
   a camera module mounted within the alignment structure, wherein the camera module comprises a housing, a cylindrical member that protrudes from the housing and a lens mounted on the cylindrical member, wherein the cylindrical member includes a radially extending tab that extends from the cylindrical member, wherein the radially extending tab of the cylindrical member mates with the notch between the protrusions of the alignment structure mounted to the housing structure such that the radially extending tab and the notch rotationally align the camera module with the housing structure, wherein the electronic device housing structure comprises a transparent member coated with a layer of opaque material, wherein the layer of opaque material has an opening that forms the camera window, wherein the opening in the ring-shaped member has a circular shape with a center, and wherein the camera window comprises a circular opening with a center that is aligned with the center of the circular shape of the ring-shaped member.

2. The apparatus defined in claim 1 wherein the electronic device housing structure comprises a planar member.

3. The apparatus defined in claim 1 wherein the transparent member comprises a planar glass layer.

4. The apparatus defined in claim 3 wherein the planar glass layer comprises a planar rear housing member in a cellular telephone.

5. The apparatus defined in claim 1 wherein the electronic device housing structure comprises a glass plate and wherein the opaque material comprises a layer of opaque ink.

6. An electronic device, comprising:
   a camera module;
   alignment structures having portions that mate with the camera module and that rotationally and laterally align the camera module with respect to the electronic device, wherein the alignment structures comprise hook-shaped structures and wherein the camera module comprises a pair of protrusions that mate with the hook-shaped structures when the camera module is aligned with the electronic device; and
   a rear surface member, wherein the alignment structures are directly attached to the rear surface member, wherein the rear surface member comprises a layer of ink with a camera opening and wherein the camera module has a lens that is aligned with the camera opening.

7. The electronic device defined in claim 6 wherein the rear surface member comprises a planar rear surface member.

8. The electronic device defined in claim 7 wherein the planar rear surface member comprises a layer of glass.

9. An electronic device, comprising:
   a camera module;
   alignment structures having portions that mate with the camera module and that rotationally and laterally align the camera module with respect to the electronic device, wherein the alignment structures comprise hook-shaped structures and wherein the camera module comprises a pair of protrusions that mate with the hook-shaped structures when the camera module is aligned with the electronic device;
   a rear surface member, wherein the alignment structures are directly attached to the rear surface member, wherein the rear surface member comprises a layer of ink with a camera opening, wherein the camera module has a lens that is aligned with the camera opening, and wherein the rear surface member comprises a planar rear surface member;

a printed circuit board; and at least one spring between the camera module and the printed circuit board.

\* \* \* \* \*